US010216945B2

(12) United States Patent
Ghazanfari

(10) Patent No.: US 10,216,945 B2
(45) Date of Patent: Feb. 26, 2019

(54) DIGITAL TOUCH SCREEN DEVICE AND METHOD OF USING THE SAME

(71) Applicant: CLIPO, INC., San Ramon, CA (US)

(72) Inventor: Faryar Ghazanfari, San Ramon, CA (US)

(73) Assignee: Clipo, Inc., San Ramon, CA (US)

( * ) Notice: Subject to any disclaimer, the term of this patent is extended or adjusted under 35 U.S.C. 154(b) by 0 days.

(21) Appl. No.: 15/256,742

(22) Filed: Sep. 6, 2016

(65) Prior Publication Data

US 2017/0075561 A1 Mar. 16, 2017

Related U.S. Application Data

(60) Provisional application No. 62/218,572, filed on Sep. 15, 2015, provisional application No. 62/218,569, filed on Sep. 15, 2015, provisional application No. 62/218,574, filed on Sep. 15, 2015, provisional application No. 62/218,575, filed on Sep. 15, 2015, provisional application No. 62/218,576, filed on Sep. 15, 2015.

(51) Int. Cl.

| | |
|---|---|
| ***G06F 3/0488*** | (2013.01) |
| ***G06F 21/60*** | (2013.01) |
| ***G06F 3/0484*** | (2013.01) |
| ***G06F 3/041*** | (2006.01) |
| ***G09G 5/377*** | (2006.01) |

(52) U.S. Cl.

CPC .......... *G06F 21/604* (2013.01); *G06F 3/0488* (2013.01); *G09G 5/377* (2013.01); *G06F 2203/04804* (2013.01); *G09G 2340/12* (2013.01); *G09G 2358/00* (2013.01)

(58) Field of Classification Search

CPC ...... G06F 21/604; G06F 3/0488; G09G 5/377

See application file for complete search history.

(56) References Cited

U.S. PATENT DOCUMENTS

| | | | | |
|---|---|---|---|---|
| 2012/0028659 A1* | 2/2012 | Whitney | H04M 1/72547 | 455/466 |
| 2013/0194301 A1* | 8/2013 | Robbins | G06F 21/60 | 345/629 |
| 2015/0007351 A1* | 1/2015 | Janajri | H04L 63/04 | 726/30 |
| 2016/0285803 A1* | 9/2016 | Strohl | H04L 51/10 | |
| 2016/0294750 A1* | 10/2016 | Ansari | G06F 3/0485 | |
| 2017/0336960 A1* | 11/2017 | Chaudhri | G06F 3/04883 | |

* cited by examiner

*Primary Examiner* — Ariel Balaoing

(74) *Attorney, Agent, or Firm* — Shun Yao; Park, Vaughan, Fleming & Dowler LLP

(57) ABSTRACT

Some embodiments on the invention are directed to displaying and viewing secure digital contents on touch screen displays. In one embodiment, a digital content such as image, text, or video is displayed on a touch screen display. An obscured layer that prevents viewing of the content protects the digital content. The obscured layer can be temporarily removed by a finger stroke in any direction on the touch screen display. As the finger is moved on the screen the area underneath the stroke is cleared and the content is revealed. The cleared area is then obscured again after a predetermined amount of time. This novel method prevents saving the digital content by taking a screenshot.

10 Claims, 25 Drawing Sheets

100 132 200 A B 210

132

100

Touch ID

Touch ID for "Auth"

Are you the device owner?

Enter Password

Cancel

FIG. 20

DIGITAL TOUCH SCREEN DEVICE AND METHOD OF USING THE SAME

CROSS-REFERENCE TO RELATED APPLICATIONS

This application claims priority from the following provisional applications: application No. 62/218,572 filed on Sep. 15, 2015, entitled Digital Touch Screen Device and Method of Using the Same, application No. 62/218,569, filed on Sep. 15, 2015, entitled Digital Touch Screen Device and Method of Using the Same, application No. 62/218,574, filed on Sep. 15, 2015, entitled Digital Touch Screen Device and Method of Using the Same, application No. 62/218,575, filed on Sep. 15, 2015, entitled Systems, Methods, and apparatus for Securely Displaying Digital Content on a Touch Screen Display, and application No. 62/218,576, filed on Sep. 15, 2015, entitled Systems, Methods and Apparatus for Generating Digital Content, all of which are incorporated herein by reference in their entirety for all purposes.

BACKGROUND

Embodiments of the invention disclose several embodiments of a secure digital screen that allows viewing of electronic data while providing one or more security features. Such security features prevent saving the entirety of data being displayed, and also prevent unauthorized viewing of the entirety of displayed data.

BRIEF DESCRIPTION OF THE DRAWINGS

FIG. 20 shows a method of using the portable multifunction device, according to an embodiment of the invention.

DETAILED DESCRIPTION

Figure 1:
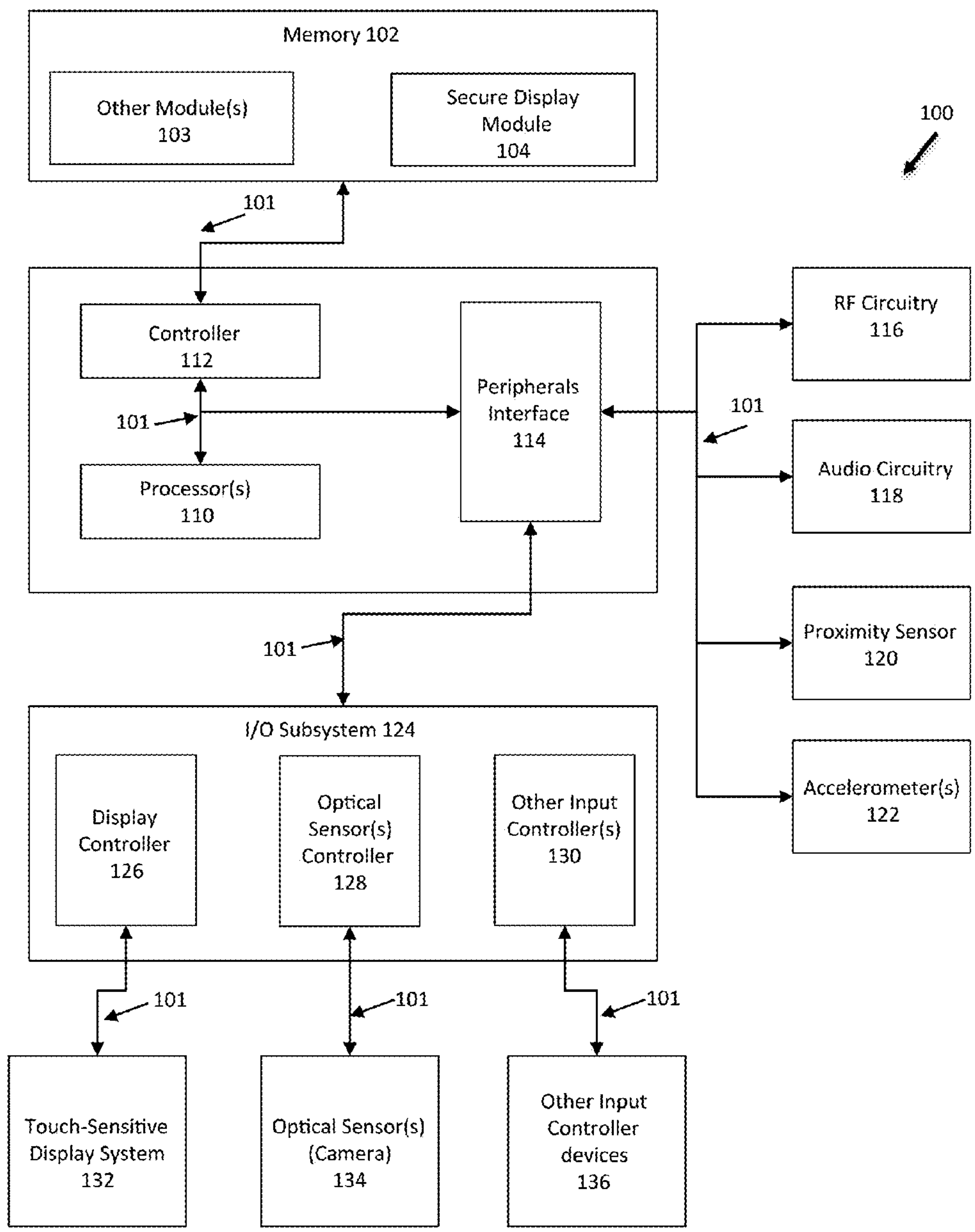
FIG. 1 shows a block diagram of a system, according to an embodiment of the invention.

Embodiments of the invention disclosed herein include systems and methods for viewing content on a touch screen device in a secure manner.

In one embodiment, a touch screen device views content (such as images, text, video, etc.) behind a layer that obscures the content such that one cannot see the content. If a finger is placed on the touch screen, the area underneath the finger is cleared such that the content becomes visible. If the finger is dragged from a first coordinate to a second coordinate in any direction, then the stroke path from the first coordinate to the second coordinate on the screen is cleared such that the content that happens to be in the same coordinates as the stroke path is cleared and visible by the eye. To view the entirety of the content the entire surface of a touch display may have to be touched (i.e. finger is dragged in a continuous motion) to clear the layer that has obscured the content.

In another embodiment, every portion of the touch screen display can be cleared for a predetermined amount of time, and after that time, that portion of the touch screen may be obscured again to render the content invisible or hard to read/see. For example, as a path is cleared from a first coordinate on the touch screen to a second coordinate on the touch screen, the cleared path may become obscured again after a predetermined amount of time. Therefore, the entirety of the content shown on the touch screen is not visible at any given point in time, and the clearing gesture of a finger only makes a portion of the content visible for a certain period of time after which the content is obscured again. This technique prevents saving the entirety of the content with a screenshot. Some electronic devices with touch screens have a screen capture functionality that is managed by a firmware and cannot be disabled by software running on the device. Also, some operating systems (such as Apple's iOS) allow for receiving notification when the screen capture functionality is activated, but do not provide the ability to disable the screen capture functionality. Embodiments of the invention prevent the screen capture function of the device from saving the entire content in a visible manner. Instead what is saved by the screen capture functionality may be at best a partial view of the content.

In one embodiment, when a finger is dragged from a first coordinate on the touch screen toward a second coordinate, a path may be cleared and the content underneath that path may become visible for a predetermined amount of time as described above. However, in addition to the "time lag" where the visible portion is obscured again after a certain amount of time, if the finger is lifted off the screen, the entirety of the screen may be obscured regardless of how much viewing time still remains. As a result, the area that can be captured with a screen capture functionality of a device is reduced further.

In one embodiment, as a user is clearing the touch screen with a finger, the front-facing camera of an electronic device can start recording a video. The recording may stop when the user is done viewing the content and stops clearing the screen. The recorded video may then be transmitted back to the sender of the content so that the sender can view the recipient at the very moment that the transmitted content was being viewed. In another embodiment, in addition to the recording, the finger stroke path of the user may also be saved or recorded and transmitted back to the sender of the content. In addition or in lieu of the video of the recipient, the sender may also see a screen recording of the recipient's touch screen as the finger strokes were clearing the screen and the content was being viewed.

In another embodiment, the front facing camera records and/or may take a picture from the face of the recipient. The picture and/or video may then be analyzed by a face-recognition algorithm to authenticate the recipient. After authentication of the recipient, the clearing of the screen by finger stroke may be enabled, or the entirety of the content may appear on the screen.

An overview of a typical touch screen is provided below. It will be understood by those skilled in the art, that the following overview will not be limiting and the description below explains the basic method of operation of touch screen devices. Electronic devices can use different methods to detect a person's input on a touch screen. Most of them use sensors and circuitry to monitor changes in a particular state. Many, including the iPhone (designed and manufactured by Apple; Inc. in California), monitor changes in electrical current. Others monitor changes in the reflection of waves. These can be sound waves or beams of near-infrared light. Other systems may use transducers to measure changes in vibration caused when finger hits the screen's surface or cameras to monitor changes in light and shadow.

When a finger is placed on the screen, it may change the state that the device is monitoring. In screens that rely on sound or light waves, a finger physically blocks or reflects some of the waves. Capacitive touch screens such as iPhone use a layer of capacitive material to hold an electrical charge. Touching the screen changes the amount of charge at a specific point of contact. In resistive screens, the pressure from a finger causes conductive and resistive layers of circuitry to touch each other, changing the circuits' resistance. In either case the detected touch by the hardware may then be translated into data by one or more firmware and such data be made available to the operating system which in turn allows software to receive such data and use it as needed.

In some embodiments, heuristics are used to translate imprecise finger gestures into actions desired by the user. The heuristics may be controlled by the software or may be controlled by lower level software within the operating system. For example, in iPhone, software (or Apps) receive the touch data from a class called UIResponder. The hardware generate electronic data that result from the finger touching the screen and provide that data to the operating system (iOS in case of iPhone). The operating system then provides that data to higher level software via one or more defined classes.

Attention is now directed towards embodiments of the device. FIG. 1 is a block diagrams illustrating portable multifunction devices 100 with touch-sensitive displays 130 in accordance with some embodiments. The touch-sensitive display 132 is sometimes called a "touch screen" for convenience, and may also be known as or called a touch-sensitive display system. The device 100 may include a memory 102 (which may include one or more computer readable storage mediums), a memory controller 112, one or more processing units (CPU's) 110, a peripherals interface 114, RF circuitry 116, audio circuitry 118 (which include a speaker and a microphone), Proximity sensor 120, Accelerometer(s) 122, an input/output (I/O) subsystem 124, other input or control devices 130, Optical sensor(s) controller 128, display controller 126, touch sensitive display system 132, optical sensor(s) (camera) 134 and other input control devices 136. These components may communicate over one or more communication buses or signal lines 101.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the processor(s) 110 and the peripherals interface 114, may be controlled by the memory controller 112.

The peripherals interface 114 couples the input and output peripherals of the device to the processor(s) 110 and memory 102. The processors(s) 110 run or execute various software programs and/or sets of instructions stored in memory 102 to perform various functions for the device 100 and to process data.

The I/O subsystem 124 couples input/output peripherals on the device 100, such as the touch screen 132 and other input/control devices 136, to the peripherals interface 114. The I/O subsystem 126 may include a display controller 126 and one or more input controllers 130 for other input or control devices. The input controllers 160 may receive/send electrical signals from/to other input or control devices 116. The other input/control devices 130 may include physical buttons (e.g., push buttons, rocker buttons, etc.), dials, slider switches, joysticks, click wheels, and so forth. In some alternate embodiments, input controller(s) 130 may be coupled to any (or none) of the following: a keyboard, infrared port, USB port, and a pointer device such as a mouse.

The touch-sensitive touch screen 132 provides an input interface and an output interface between the device and a user. As explained above, the display controller 126 receives and/or sends electrical signals from/to the touch screen 132. The touch screen 132 displays visual output to the user. The visual output may include graphics, text, icons, video, and any combination thereof (collectively termed "graphics", "electronic content", and/or "electronic data"). In some embodiments, some or all of the visual output may correspond to user-interface objects, further details of which are described below.

A touch screen 132 has a touch-sensitive surface, sensor or set of sensors that accept input from the user based on haptic and/or tactile contact. The touch screen 132 and the display controller 126 (along with any associated modules and/or sets of instructions in memory 102) detect contact (and any movement or breaking of the contact) on the touch screen 132 and convert the detected contact into interaction with user-interface objects (e.g., one or more soft keys, icons, web pages or images) that are displayed on the touch screen. In an exemplary embodiment, a point of contact between a touch screen 132 and the user corresponds to a finger of the user.

The touch screen 132 may use LCD (liquid crystal display) technology, or LPD (light emitting polymer display) technology, although other display technologies may be used in other embodiments. The touch screen 132 and the display controller 126 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 132.

A touch-sensitive display in some embodiments of the touch screen 132 may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety.

A touch-sensitive display in some embodiments of the touch screen 132 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 132 may have a resolution in excess of 100 dpi. In an exemplary embodiment, the touch screen may have a resolution of approximately between 326-401 dpi or more. The user may make contact with the touch screen 132 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user using various heuristics.

In some embodiments, the software components stored in memory 102 may include a secure display module 104 which allows viewing electronic contents such as text, image and video is a secure fashion. Memory 102 may include other modules that store various other control logics such as an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The contact/motion module may detect contact with the touch screen 132 (in conjunction with the display controller 126) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen 132, and determining if the contact has been broken if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller 126 also detects contact on a touchpad.

Figure 2:
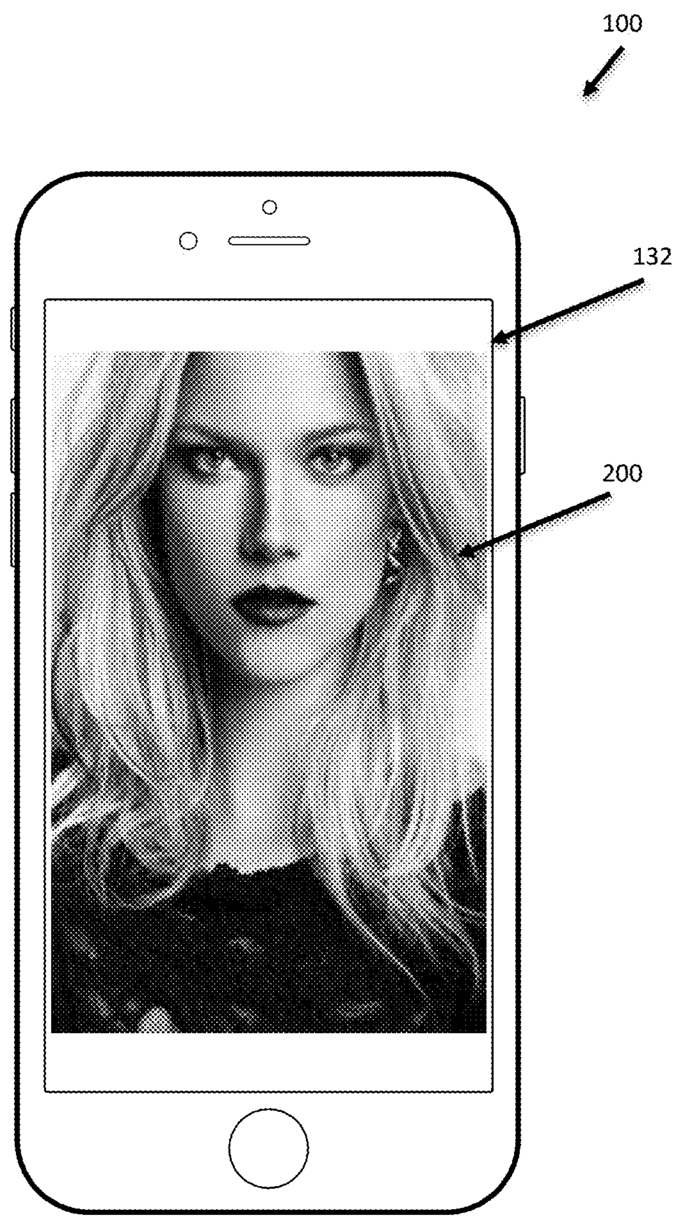
FIG. 2 shows a portable multifunction device, according to an embodiment of the invention.
Figure 3:
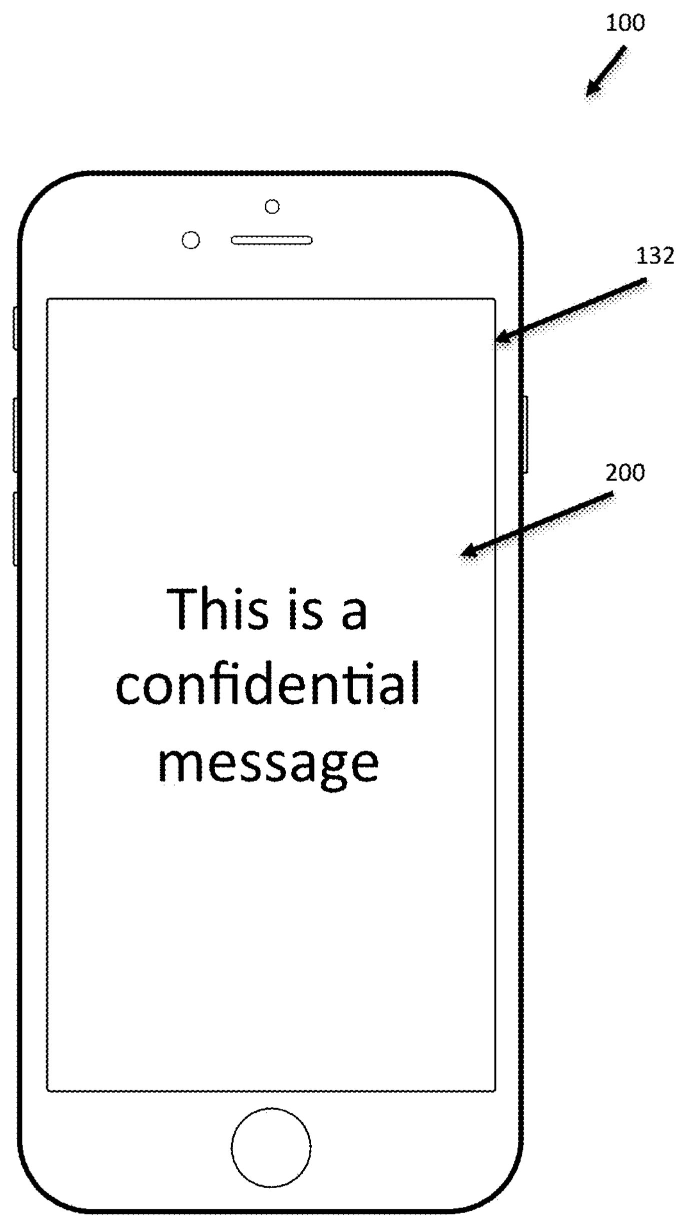
FIG. 3 shows a portable multifunction device, according to an embodiment of the invention.

Operation of secure module display 104 will now be described with reference to the figures. FIGS. 2 and 3 show a portable multifunction device 100 having the touch screen 132. It will be understood by those skilled in the art that even though an iPhone (manufactured by Apple, Inc.) is shown as the portable multifunction device 100, other portable multifunction devices such (e.g. Samsung Gallaxy) may be used. Thus, portable multifunction device is not limited by examples of such device shown or described herein, but the term "multifunction portable device" shall be construed to mean any electronic device having at least a touch screen display.

Figure 4:
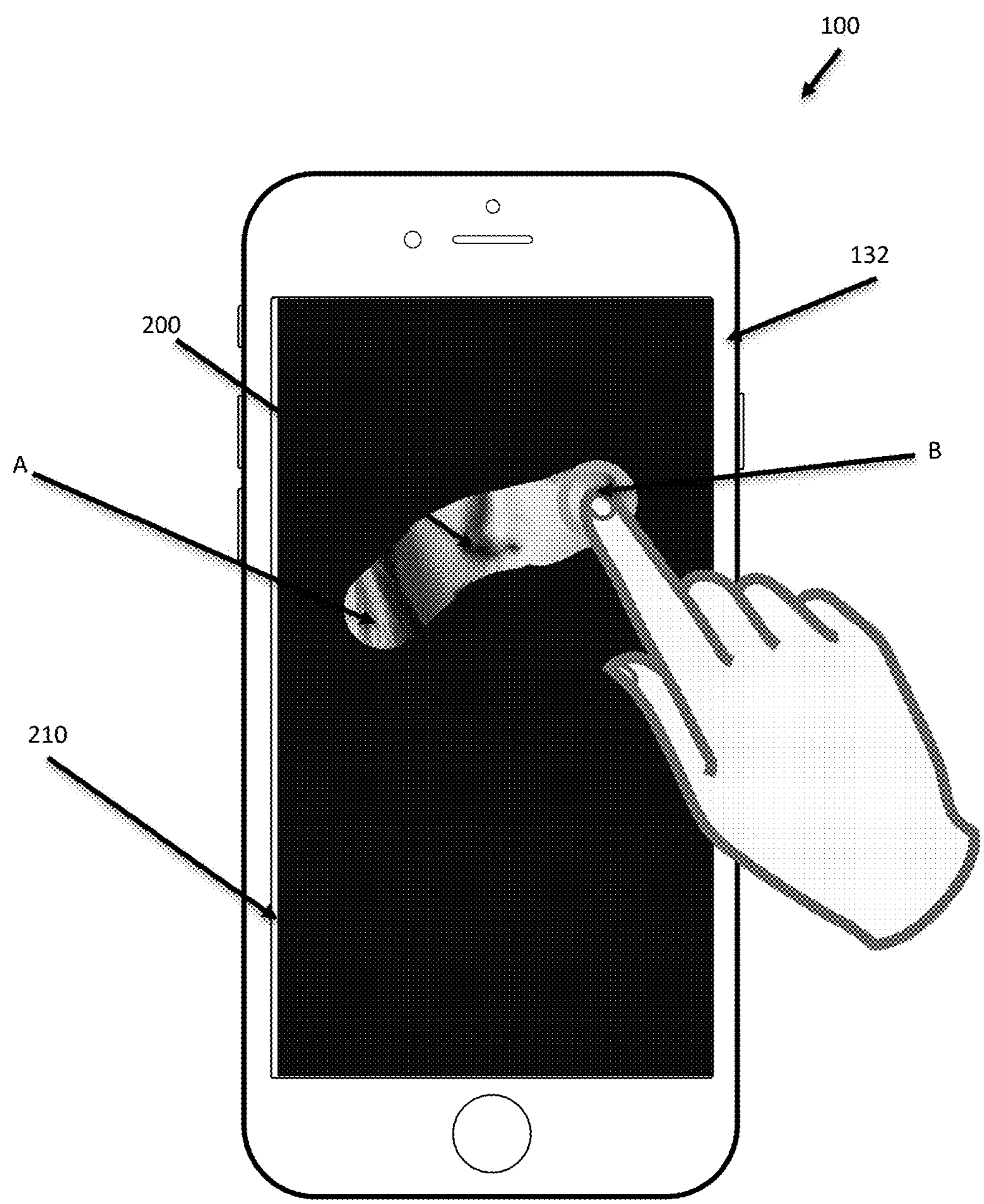
FIG. 4 shows a method of using the portable multifunction device, according to an embodiment of the invention.

As shown in FIGS. 2 and 3 the multifunction portable device 100 may display content 200 which may be in the form of an image (as shown in FIG. 2) or text (as shown in FIG. 3) or a video (not shown). As noted above, some devices allow the recipient of the electronic content to save that content by taking a screenshot. However, the sender of the content may not want the recipient of the content to save it. In one embodiment, the content may be transferred though the secure display module 104 from a first device in possession of the sender of the content to a second device in possession of the recipient of the content. As shown in FIG. 4, when the recipient attempts to view the content using the secure display module 104, the touch screen 132 appears to display an obscure layer 210 on top the content 200 which might be an image as shown in FIG. 4. Note that the touch screen "appears" to be displaying, from a vantage point of an end-user, that an obscure layer is on top of the content and preventing the viewing of the content.

Figure 5:
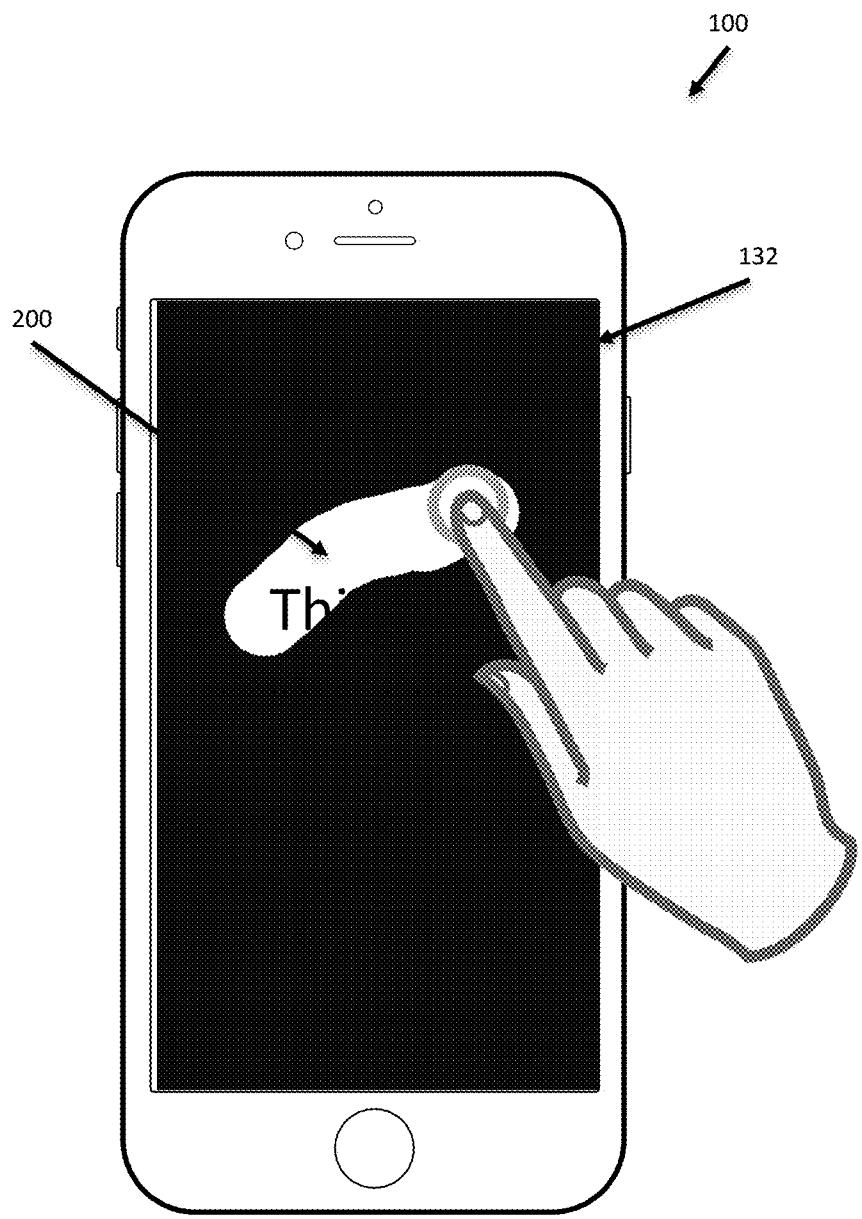
FIG. 5 shows a method of using the portable multifunction device, according to an embodiment of the invention.
Figure 6:
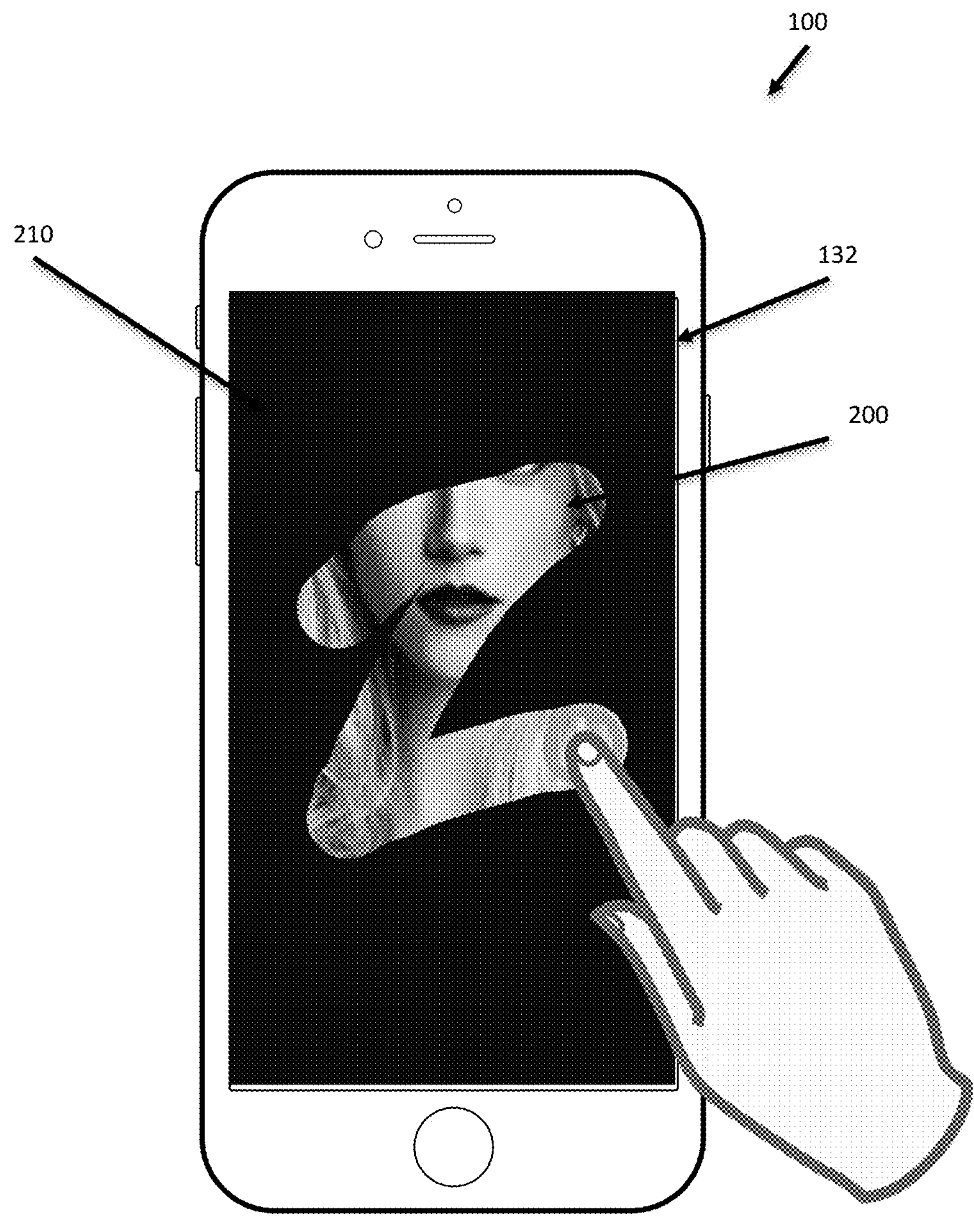
FIG. 6 shows a method of using the portable multifunction device, according to an embodiment of the invention.

As shown in FIG. 4, a finger swipe on the touch screen from point A to point B appears to remove a portion of the obscure layer 210 that correspond to an area underneath the finger. In other words, the obscure layer can be removed by "wiping" the touch screen 132 with finger. FIG. 5 is similar to FIG. 4 expect that in FIG. 5 the content is the text message shown in FIG. 3 whereas in FIG. 4, the content is the image shown in FIG. 2. FIG. 6 shows that continuing to drag the finger on the touch screen 132 continues to remove the obscure layer and will make more of the content 200 visible.

In one embodiment, to prevent the recipient of the content from saving the content by taking a screenshot, the area that was cleared by dragging a finger on the touch screen 132 starts to become obscured after a predetermined amount of time. As shown in FIGS. 8A-8D, the path that was cleared by dragging the finger on the touch screen 132 can be refilled again to obscure the content and prevent the recipient from saving the content with screenshot. In one embodiment, the sender of the content again may determine the time it takes for the cleared path to become obscured again. The sender may set the time limit where a cleared area of the content stays clear and after that time, that area of the screen is filled with the obscured layer.

In one embodiment, the obscured layer 210 may appear as a solid color (e.g. black) or any other combination of colors, drawings, artwork, image, animation, etc. In another embodiment, the obscured layer 210 may appear as semi-transparent blur (such as Gaussian blur) on top of the original content such that the content is somewhat visible through the obscured layer. As used herein, the obscured layer 210 shall be construed as any layer, image, video, animation, etc. that fully or partially hides the content from being fully viewed on the touch screen 132.

Figure 7:
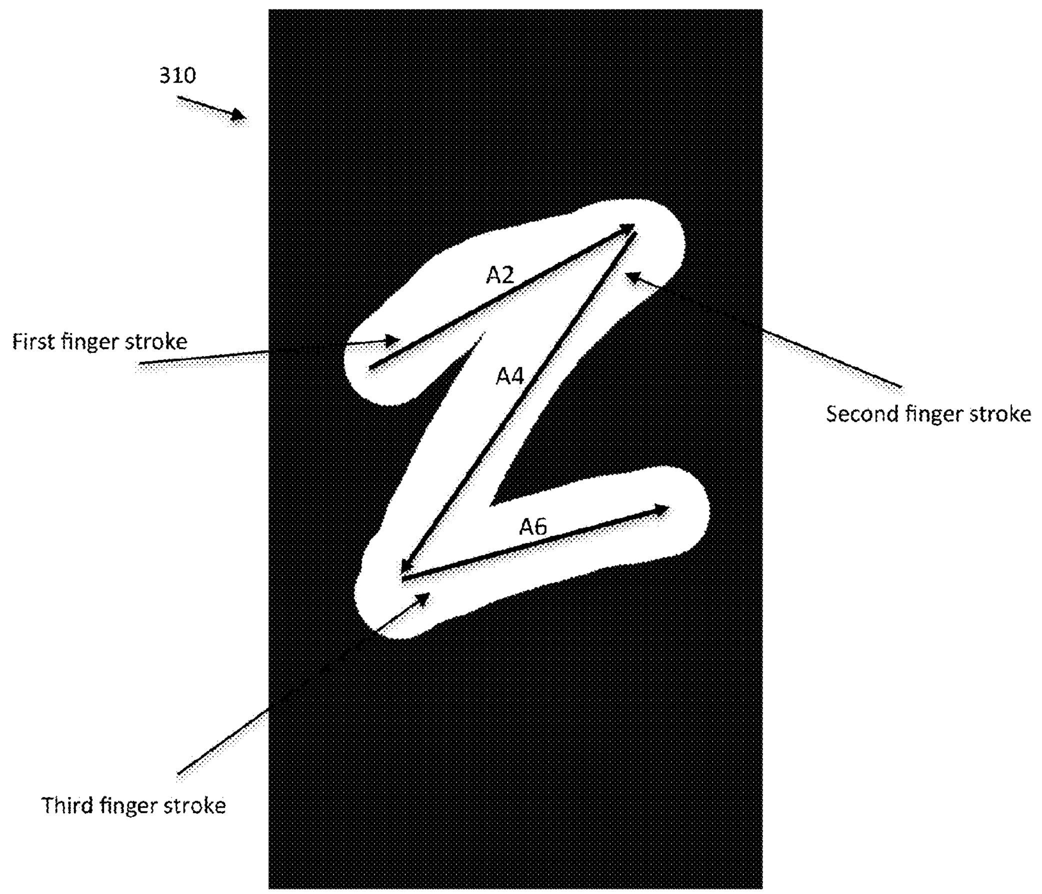
FIG. 7 shows a method of using the portable multifunction device, according to an embodiment of the invention.
Figure 8A:
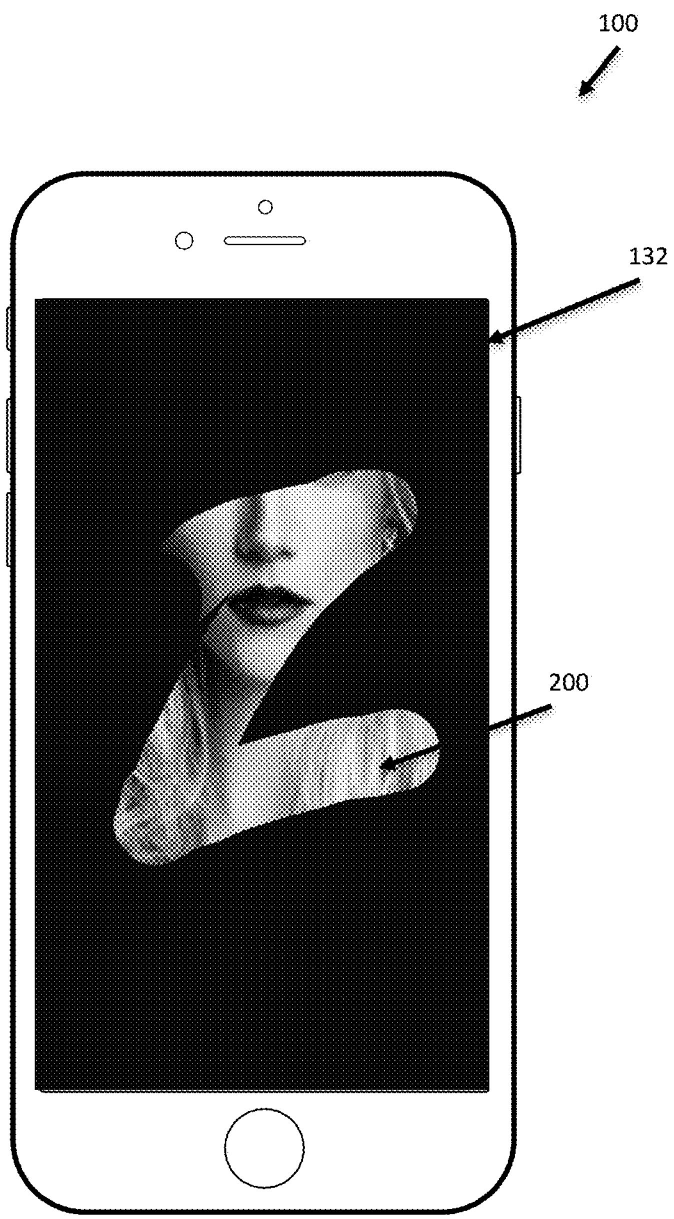
FIG. 8A shows a method of using the portable multifunction device, according to an embodiment of the invention.
Figure 8B:
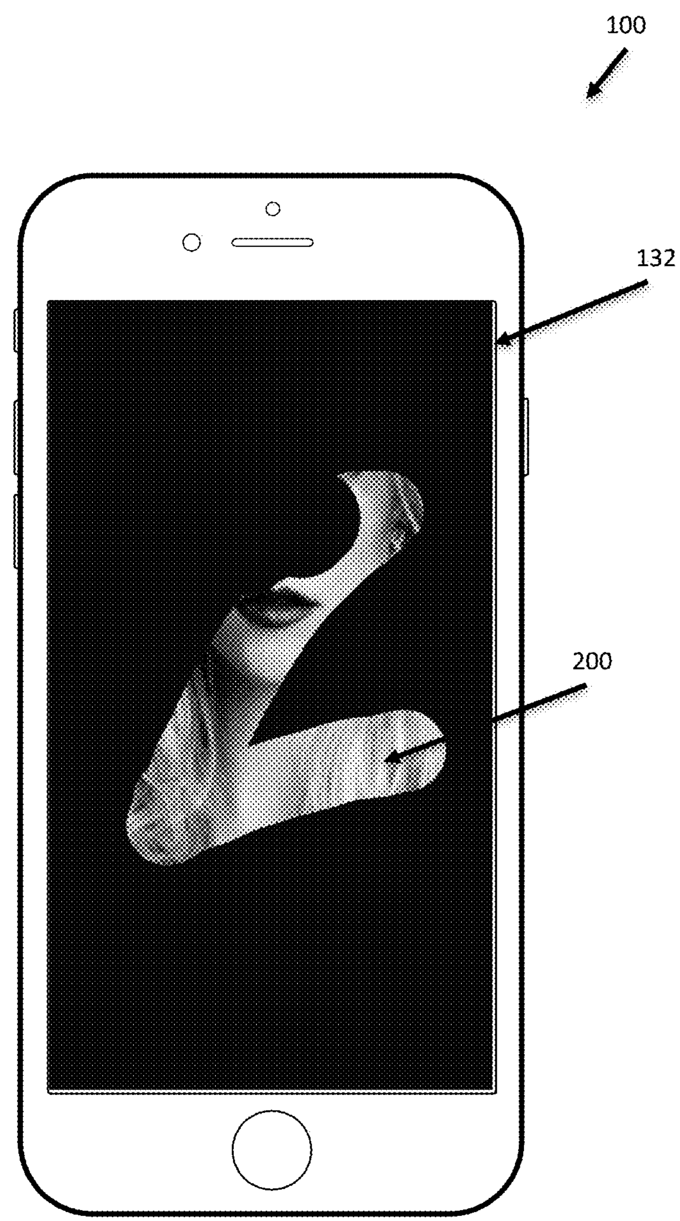
FIG. 8B shows a method of using the portable multifunction device, according to an embodiment of the invention.
Figure 8C:
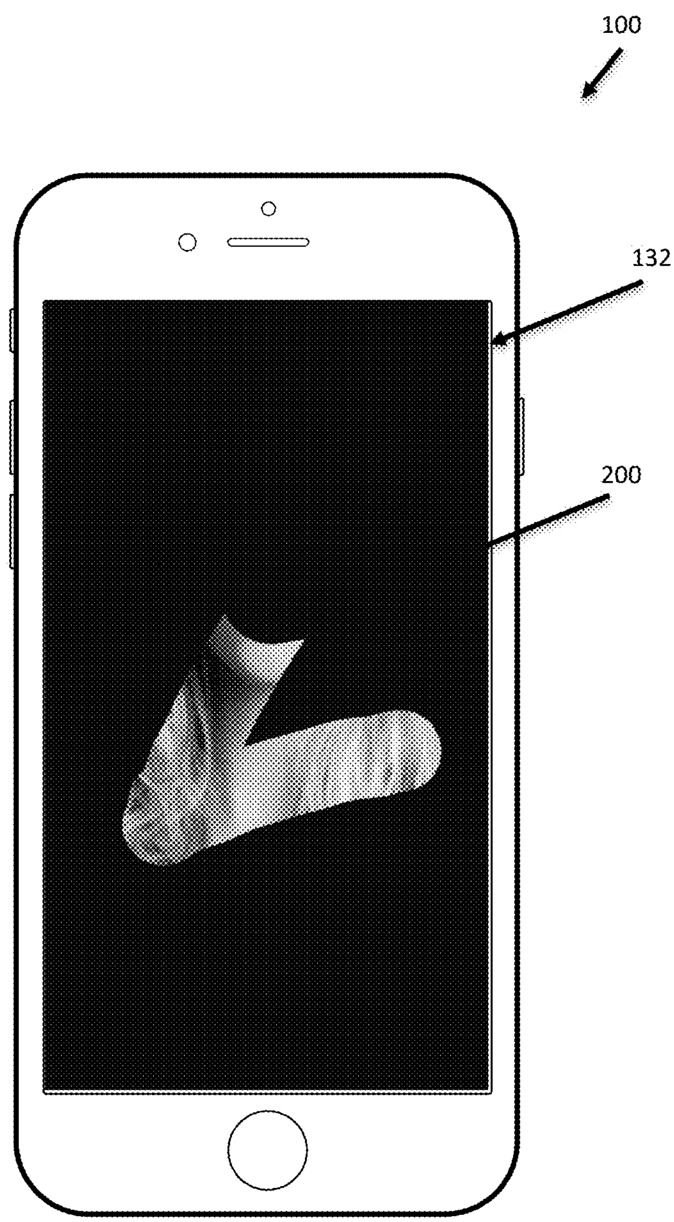
FIG. 8C shows a method of using the portable multifunction device, according to an embodiment of the invention.
Figure 8D:
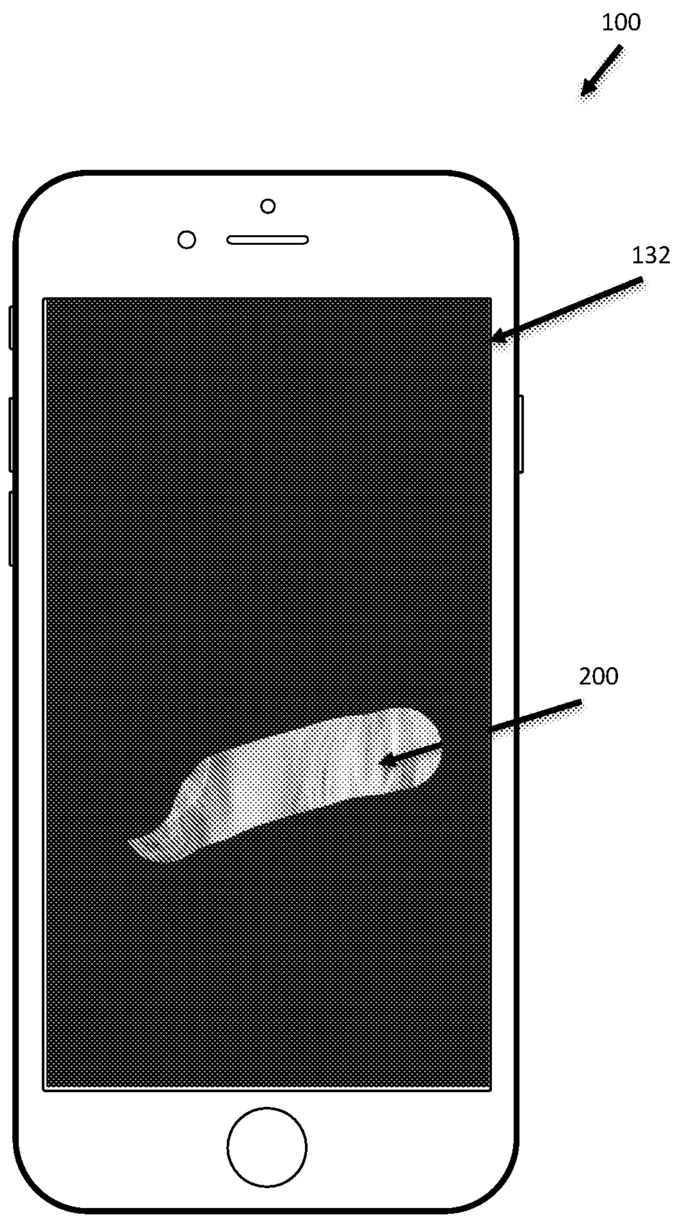
FIG. 8D shows a method of using the portable multifunction device, according to an embodiment of the invention.

One method of achieving the above-noted operation with respect to clearing the obscured layer 210 will now be described. It will be understood by those skilled in the art that the following description is exemplary and not limiting. FIG. 7 shows an obscured layer 310 that has been partially cleared (or "wiped") by three strokes of finger. Each finger path and its direction is illustrated by one arrow in FIG. 7. In one embodiment, when a finger touches the touch screen 132 the coordinates that correspond to the path of the finger on the touch screen are saved in memory. For example, in FIG. 7, A2 is the collection of pixel data representing the first path of the finger on the touch screen 132. Similarly, A2 and A3 are collection of pixel data representing the second and third path of the finger on the touch screen 132. Through out the specification A2, A4, and A6 may be used to interchangeably refer to "finger stroke", "cleared path(s)", and/or "pixel data" depending on the frame of reference. From the vantage point of a recipient who is wiping the screen clean, A2, A4, and A6 represent the finger strokes that result is one or more cleared paths through which the original image/text can be viewed. From the vantage point of the system, A2, A4, and A6 may refer to pixel data that correspond to the locations/coordinates on the touch screen 132 where the cleared paths are located.

Figure 9:
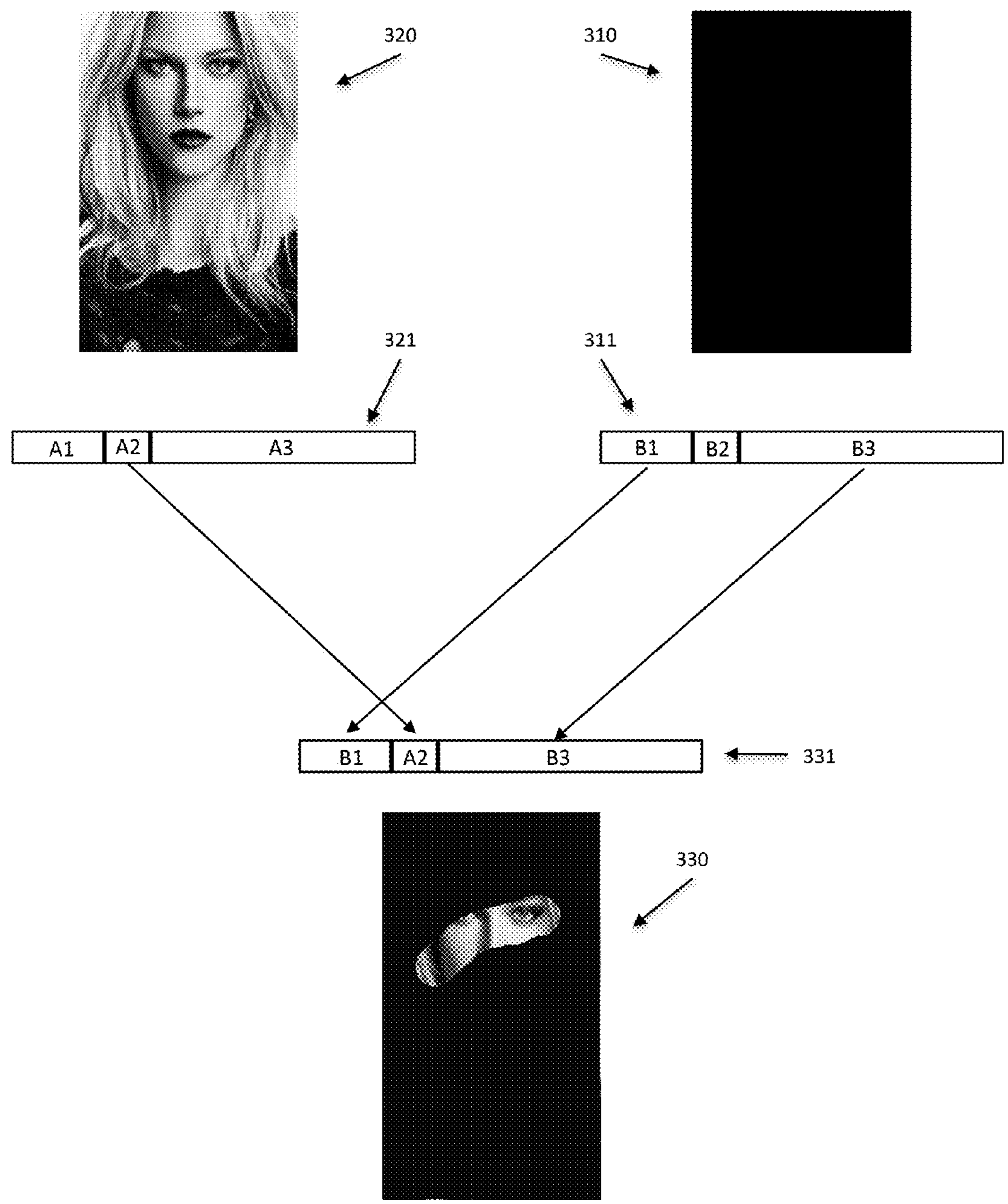
FIG. 9 shows a method of generating image data, according to an embodiment of the invention.

In one embodiment, shown in FIG. 9, when the obscured layer is "wiped" by a finger, the entire screen is redrawn at specific frequency to represent one image which includes pixel data from both the original image and the obscured layer. FIG. 9 shows original image 320 and a representation of that image in memory as memory block 321. FIG. 9 also shows obscured layer 310 and a representation it in memory as memory block 311. Note that 321 and 311 are not technically accurate representation of how an image is stored in memory, but memory blocks 321 and 311 are high level and modified representation of memory for the specific purpose of illustrating the method of displaying an image that has been partially cleared (or "wiped") by a finger stroke.

Figure 10:
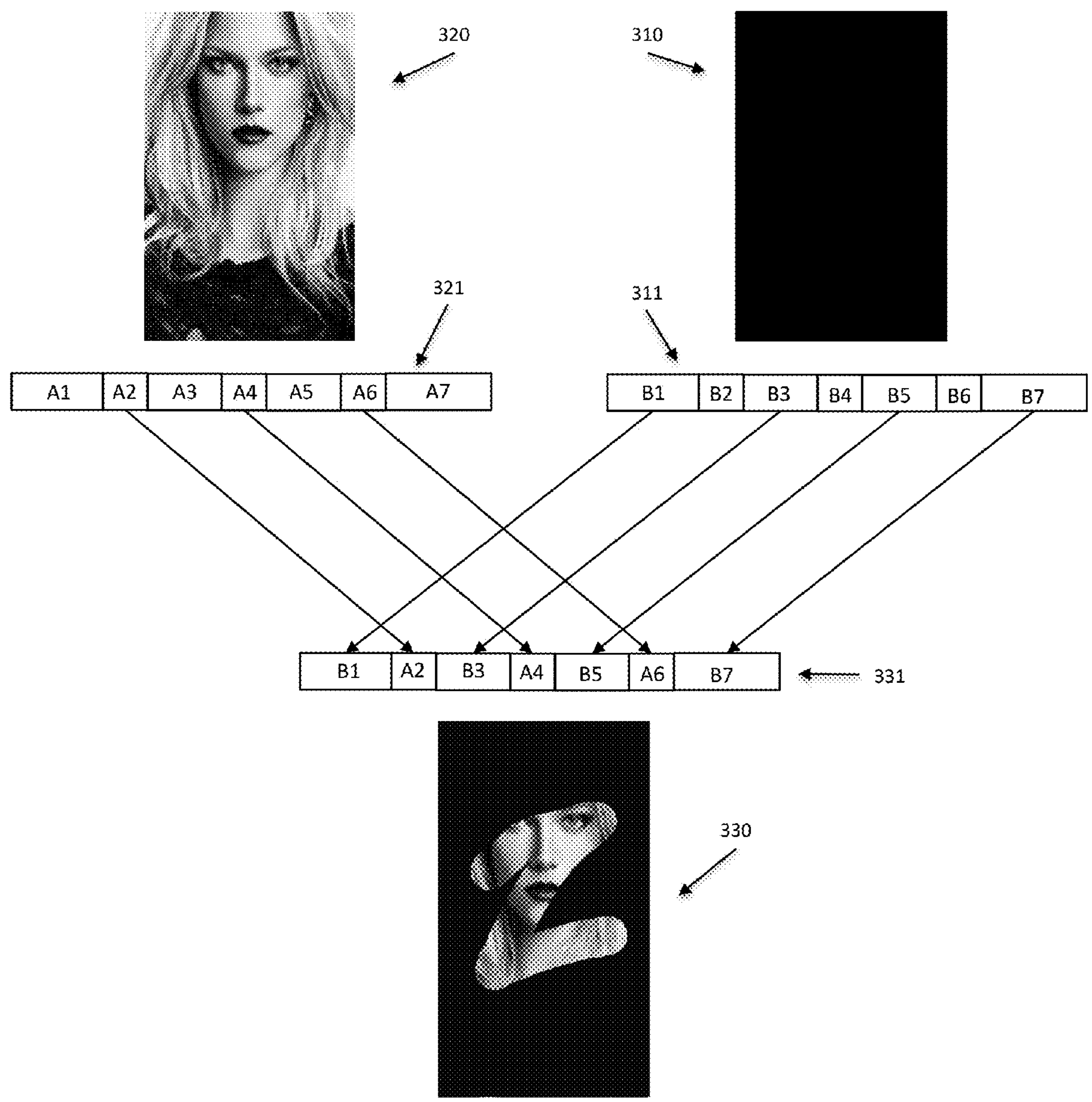
FIG. 10 shows a method of generating image data, according to an embodiment of the invention.

In FIG. 9, A2 represents the pixel data of original image 320 that are located in the same coordinate (of the image) as the coordinates that represent the first finger stroke shown in FIGS. 7. A1 and A3 represent the remainder of pixel data that together with A2 amount to representation of image 320 in memory. When the first finger stroke occurs on the touch screen 132, the coordinates of the screen representing the path that the finger traveled on the touch screen are saved in memory. Then, as shown in FIG. 10, the image 330 that is represented as memory block 331 is constructed from the original image 320 and the image 310 (which represents the obscured layer 310 as actual image data). The image 330, replaces the pixel data of the obscured layer 310 with pixel data A2 from the original image 320. This process occurs at a high enough frequency (i.e. a number of images are drawn in rapid succession on the touch screen 132) that it appears that the finger stroke is removing a portion of the obscured layer and revealing the original image underneath that obscured layer. However, in this embodiment, a new image is being drawn on the touch screen 132 at a refresh rate determined by the operating system and/or hardware of the portable multi function device 100. In one embodiment, this refresh rate is 60 frames per seconds, meaning that as the finger is traveling a path on the touch screen, the screen is being redrawn 60 times in one seconds, and each of the frames includes a portion of data A2 that corresponding to the same pixel locations that the finger has traveled on the touch screen 132.

Figure 11:
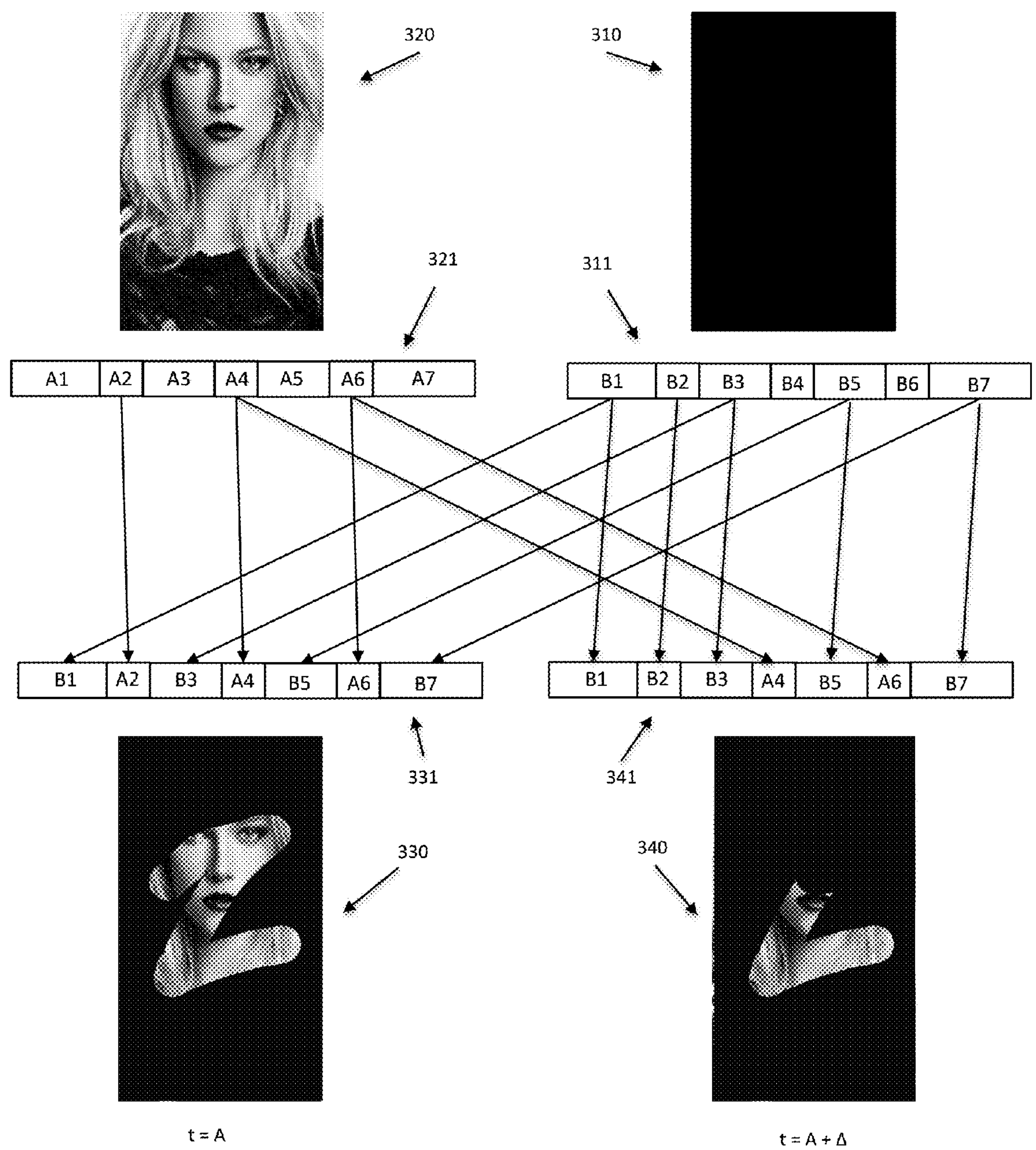
FIG. 11 shows a method of generating image data, according to an embodiment of the invention.

As noted above, in one embodiment, in order to prevent the recipient of the content from saving the content via a screenshot, the stroke path of the finger is covered by the obscured layer after a predetermined amount of time. FIG. 11 shows the process of applying the obscured layer to the areas that were previously cleared (or "wiped") by the finger stroke. Image 330 which is represented as memory block 331 includes three finger strokes A2, A4 and A6 (shown in FIG. 7), and the image is created from replacing the pixel data 311 of image 310 (i.e. the obscured layer) by the equivalent pixel data from image 320 that correspond to the same coordinates as the coordinates of the finger strokes shown in FIG. 7. Now, after a predetermined amount of time (Δ), an updated image 340 (which is shown as memory block 341) replaces a portion of the image 330 with pixel data from image 310 such that the pixel data A2 that came from image 320 are replaced by pixel data B2 that come from image 310. Therefore, as the screen refreshes at a predetermined frequency (e.g. 60 frames per seconds), the image displayed on the screen may include new areas that are now cleared but previously were obscured and obscured areas that were previously cleared.

The process shown in FIG. 11 is technically advantageous because the technique of representing both the cleared portion of the image and obscured portion of the image as one image (i.e. an image that has some pixels that represent the obscured layer and some other pixels that represent the image data) is that the process of "re-obscuring" can be achieved very efficiently even when a finger is still continuing to clear some other portions of the touch screen 132. In other words, while a finger is travelling through a path (e.g. the third finger stroke in FIG. 7) an earlier path that was cleared (e.g. first finger stroke in FIG. 7) can be re-obscured smoothly at that very moment.

Stated differently, if the process of applying the obscured layer was achieved by presenting a second layer parts of which were being deleted by a finger stroke to reveal the image underneath the layer, then it would have been hard to efficiently re-obscure part of the deleted obscured layer while at the same time some other portion of the obscured layer was being deleted. The reason is that typically drawing an image on the screen happens on the main thread, and execution of two separate processes, one being deleting a portion of the obscured layer and another being re-obscuring another portion of the image, may result in two separate control logic (i.e. two separate parts of the code of the software) to attempt to draw on the screen at the same time. When this happens, each of the control logics (clearing and re-obscuring) get interrupted in succession and the main thread is switched back and forth by them to accommodate their request to draw on the screen. This results in interruption of the clearing function by a finger stroke. Therefore, when a user is wiping the touch screen 132, the process gets momentarily interrupted to redraw the obscuring layer on another part of the screen.

The process shown in FIGS. 9-11, eliminate this problem by combining the clearing and re-obscuring the image in one image so that as the user is wiping the screen, the screen appears to clear the obscuring layer smoothly and without interruption while at the same time another portion is being re-obscured.

In one embodiment, to prevent the user from taking even a partial screenshot of the content, when the finger is lifted off the touch screen 132, the entire screen is re-obscured rapidly. In other words, instead of following the process shown in FIG. 11, the image 310 is redrawn on the screen and the entire content becomes obscured.

In one embodiment, as the obscured layer is being cleared by a finger stroke, before the cleared part of the obscured layer is re-obscured, the cleared part goes through a process in which that area starts to gradually become obscured by a series of different obscuring layers that have transparency but the transparency decreases over time.

Figure 12:
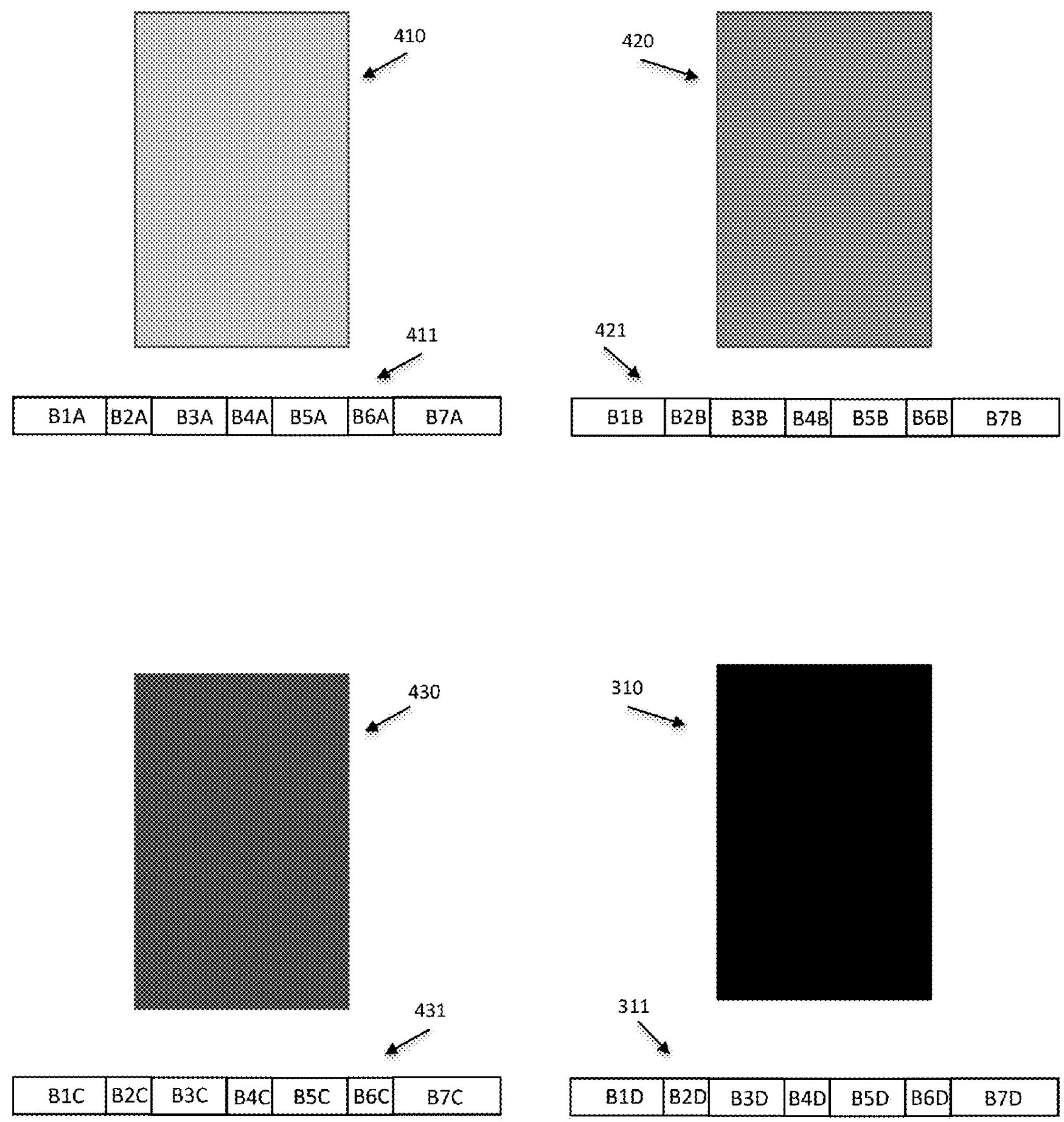
FIG. 12 shows a method of generating image data, according to an embodiment of the invention.

In one embodiment shown in FIG. 12, instead of one obscured layer 310, there are three additional obscured layers 410, 420, and 430, and each of these obscured layer has a different transparency value such that the transparency of layer 420 is more than 410 but less than 430. Also, each of the obscured layers is represented as a block of memory. Memory block 411 includes pixel data for layer 410 and segments B2A, B4A, and B6A include the pixel data corresponding to locations A2, A4, and A6 shown in FIG. 7 for the three stroke paths. Similarly, memory blocks 421, 431, and 311 include pixel data for layers 420, 430, and 310 respectively. In memory block 431, segments B2C, B4C, and B6C include the pixel data corresponding to locations A2, A4, and A6 shown in FIG. 7 for the three stroke paths. Also, in memory block 311, segments B2D, B4*d*, and B6D include the pixel data corresponding to locations A2, A4, and A6 shown in FIG. 7. The obscured layer 310 may be the same as the obscured layer shown and described with respect to FIG. 11.

Figure 13:
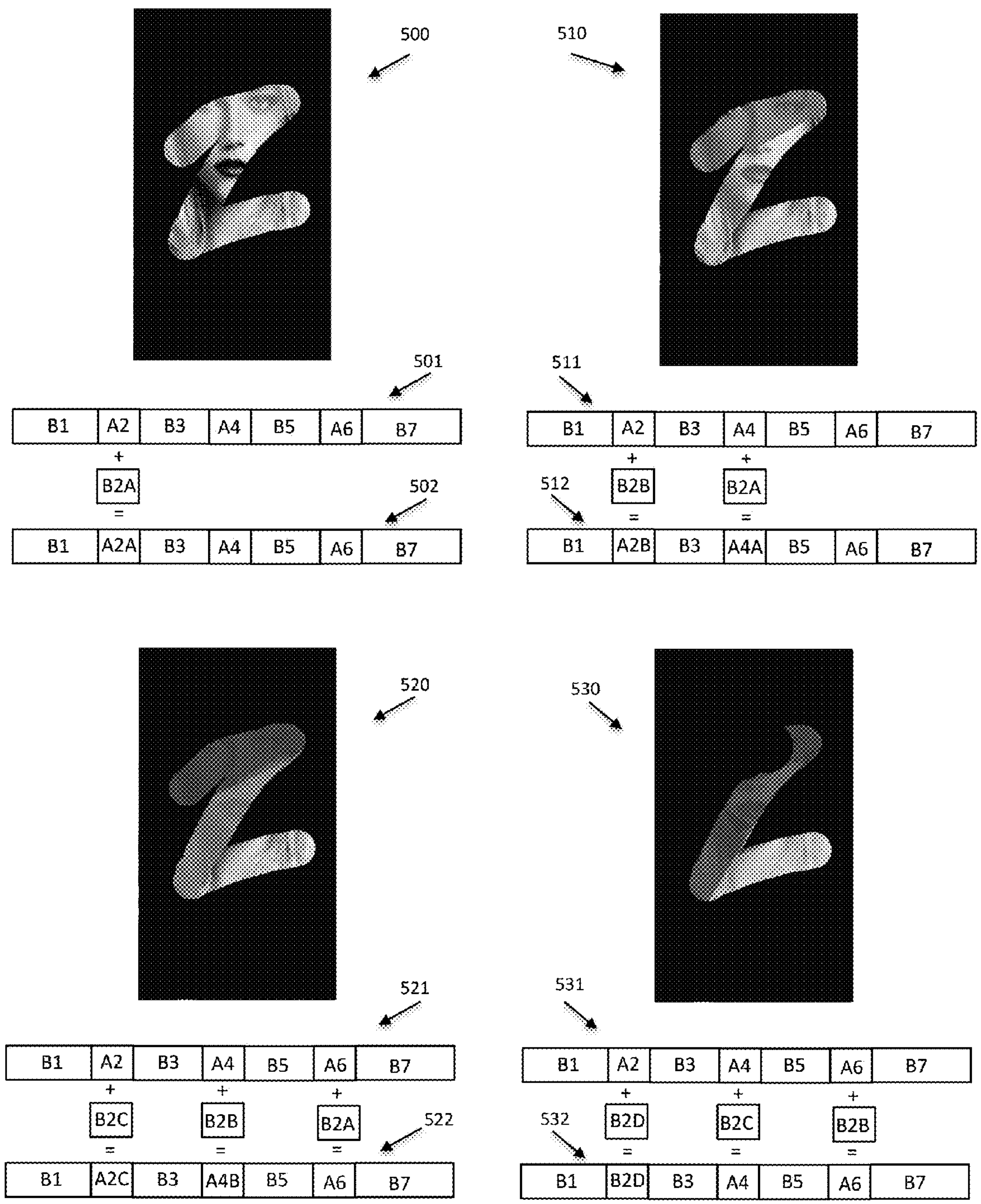
FIG. 13 shows a method of generating image data, according to an embodiment of the invention.

FIG. 13 shows the process of applying the different obscured layers 410, 420, 430 and 310 to the touch screen 132. Referring to both FIG. 12 and FIG. 13, before the final obscured layer 310 re-obscures the cleared areas of the touch screen 132, obscured layers 410, 420 and 430 start to obscure each of the cleared paths by the finger strokes A2, A4, and A6 in a successive order. As shown in FIG. 13, the pixel data B2A from memory block 411 (FIG. 12) is applied to the pixel data in memory block 501. Since, the obscured layer 410 has transparency, the pixel data of the original image will be still partially visible after addition of pixel data B2A. The resulting image is shown as memory block 502 (FIG. 13) where from the three cleared paths A2, A4, and A6, A2 now appears to include a transparent layer that somewhat obscures part of the original image visible through cleared path A2.

Referring to image 510 in FIG. 13, cleared path A2 now includes pixel data B2B from obscured layer 420 (FIG. 12) and cleared path A4 now includes pixel data B2A from the obscured layer 410 (FIG. 12). Next, as shown in image 520 (FIG. 13), cleared path A2 now includes pixel data B2C from the obscured layer 430 (FIG. 12), cleared path A4 includes pixel data B2B obscured layer 420 (FIG. 12), and cleared path A6 includes pixel data B2A from obscured layer 410 (FIG. 12). Finally, as shown in image 530, the pixel data B2D from the final obscured layer 310 re-obscure the pixel data in the cleared path A2. Therefore, as the recipient is "wiping" the touch screen 132 with finger strokes, he/she may observe an immediate and/or gradual re-obscuring of the cleared paths in successive order such that the older cleared paths start to gradually obscure until the final obscured layer that was originally obscuring the touch screen 132 reclaims the area that was "wiped" clean by the recipient.

The above-mentioned method is technically advantageous because application of multiple obscured layers at different times are all handled by drawing one single image of the screen at any given time. Stated differently, if the obscured layer were going to be applied independently to the touch screen 132 by the display controller 126, the process of wiping the screen clean by the recipient would have been interrupted so that the main thread that is re-drawing the image on the screen gets updated image data from other control logics of the secure display module 104. However, the process described with respect to FIGS. 12 and 13, eliminates this technical problem by manipulating the image data of one single image to account for all changes at various parts of the screen. Hence, as the recipient is wiping the screen clean, other parts of the image are simultaneously re-obscured smoothly and without any interruption.

Figure 14:
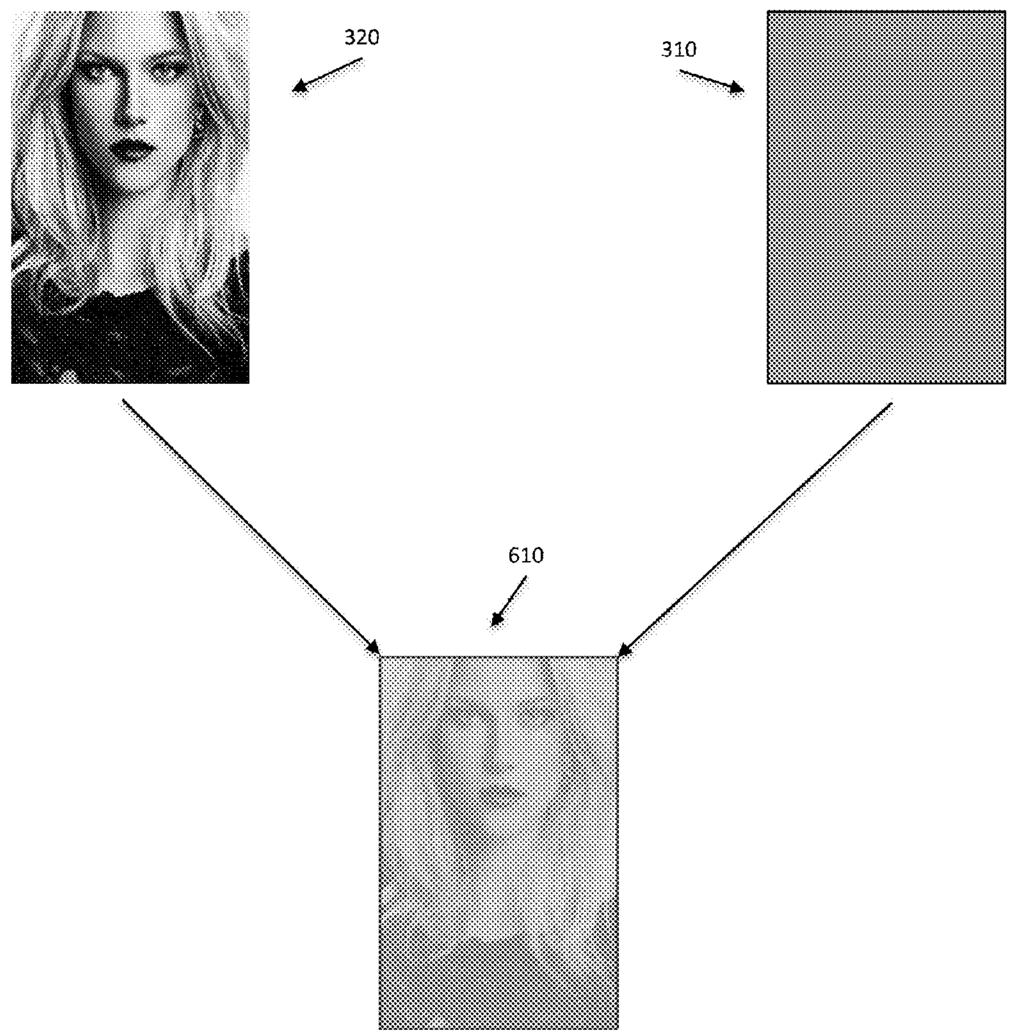
FIG. 14 shows a method of using the portable multifunction device, according to an embodiment of the invention.

In one embodiment, shown in FIG. 14, obscured layer 310 which may have some transparency is placed on the image 320. When the combined layers are displayed, the digital display renders an image that will represent the resultant image 610. In this embodiment, when finger is dragged on the touch screen, only the corresponding pixels associated with the outer layer (image 310) may be removed and the combination of the image 320 and modified image 310 are rendered by the display. When the image 310 has areas that are cleared (such as areas A2, A4 and A6), then image 320 can be visible through the cleared areas. Also, similar to the process as explained above with respect to FIG. 11, the outer layer (image 310) can be redrawn successively such that the cleared area are obscured again. Depending on the type or the device and the touch screen display, it may technically advantageous to operate on one image (here image 310) and let the display handle the presentation of the resultant image with is the combination of the image 310 to image 320.

In one embodiment, the process described above with respect to image 14, may also be employed for displaying multiple versions of the obscured layer with different transparency values to successively appears on the cleared areas as described above with respect to FIG. 12 and FIG. 13. In this embodiment, the image 320 is always supplied to the display and various versions of the obscured layer 310 (with different transparencies in different areas which may be the result of combining image 310 with other images shown in FIG. 12) and the display and the accompanying hardware, firmware and/or software handle the rendering of the resultant image.

Figure 15:
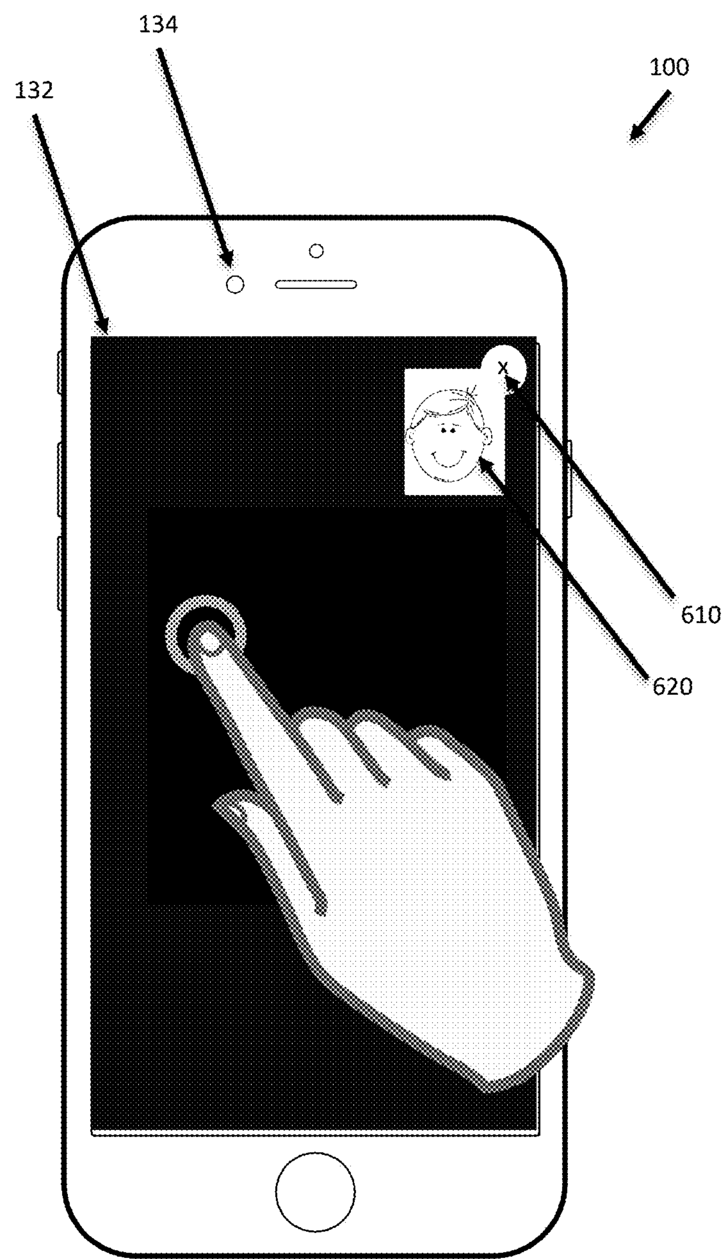
FIG. 15 shows a method of using the portable multifunction device, according to an embodiment of the invention.

In one embodiment, shown in FIG. 15, when the recipient of content views the obscured layer on the touch screen 132 and just before starting to wipe clean the screen to view the content, a frame showing live video feed 620 being captures by the front-facing camera 134 may appear at any location of the touch screen 132. In one embodiment, the recipient may need to authenticate himself/herself before viewing the content. One authentication method may be face-recognition. The recipient may be instructed to look into the front-facing camera 134 and a face recognition module (which may be part of other module(s) 103 in FIG. 1) may authenticate the recipient before allowing the screen to be cleared by finger strokes. The face recognition algorithm may be stored in memory 102 on the portable multifunction device 100 or may reside on a remote server at which time the front facing camera can send a video recording of recipient's face and/or take a number of pictures and transmit them for the remote server for verification and authentication of the recipient.

Figure 16:
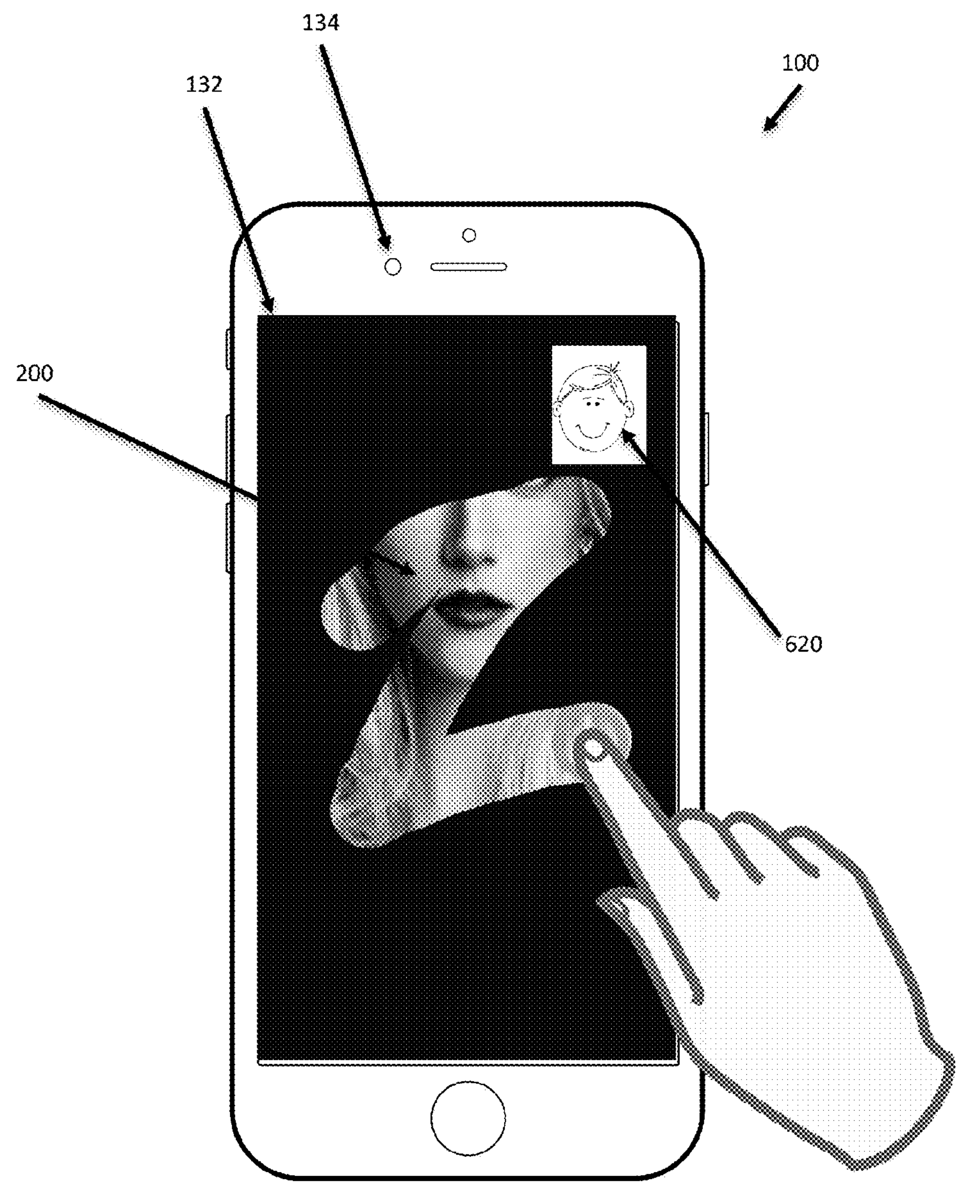
FIG. 16 shows a method of using the portable multifunction device, according to an embodiment of the invention.
Figure 17:
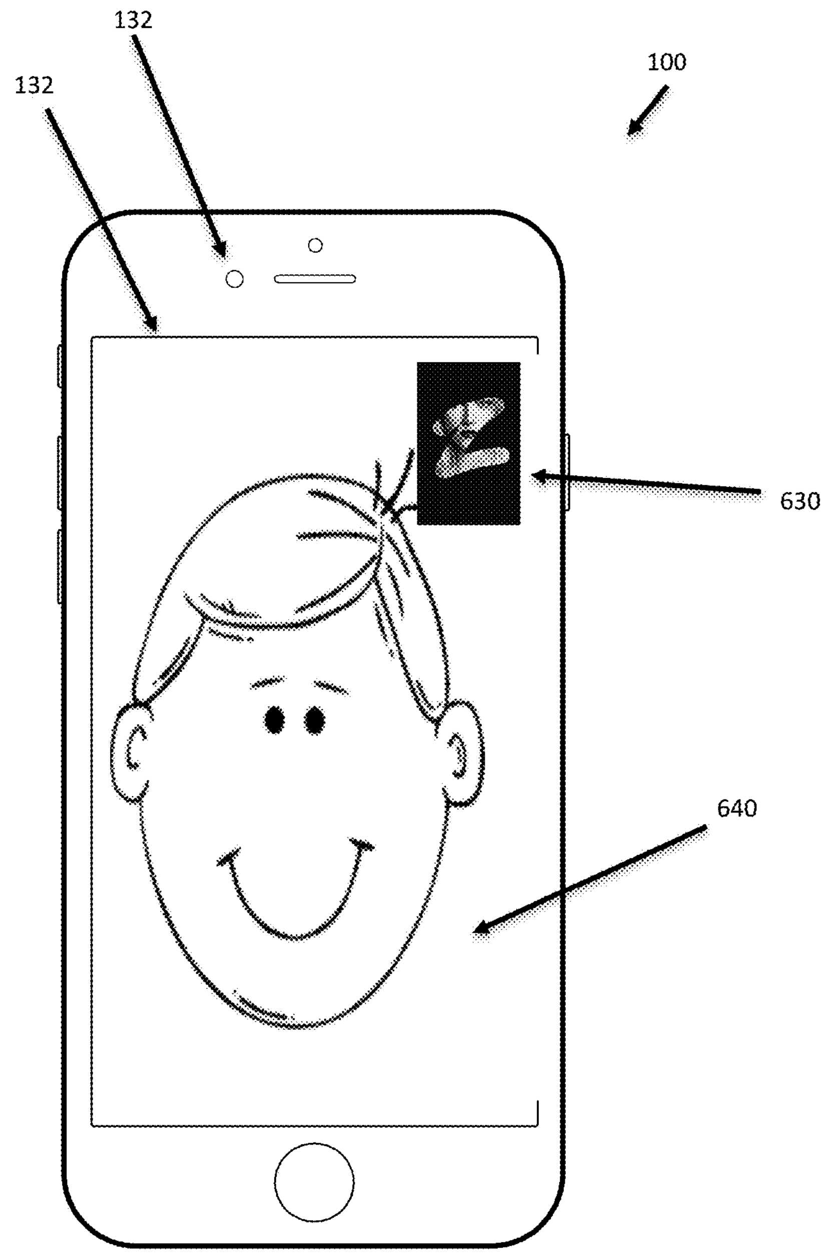
FIG. 17 shows a method of using the portable multifunction device, according to an embodiment of the invention.

In another embodiment, in addition or instead of employing face recognition to authenticate the user, the recipient may record a reaction of himself/herself while wiping the screen clean to view the content. The reaction may be a video recording during and/or after wiping the screen by the recipient, or one or more pictures. In one embodiment, when the recipient views the touch screen 132 that is covered by the obscured layer, a live video feed 620 is shown in the screen as described above. The video frame 620 may include a cancel button 610. The recipient may touch the cancel button to decline being recorded. If the cancel button is not touched and the recipient starts wiping the screen, then such action may be interpreted as consent of the recipient for recording a reaction and the cancel button 610 may disappear as shown in FIG. 16, and show the recipient's face while the screen is being wiped. In one embodiment, shown in FIG. 17, recipient's reaction may then be transmitted back to the sender. The reaction may be a video and or one or more pictures. Also, as shown in FIG. 17, the touch screen 132 may display both the reaction 640 and a recoding of the wiping action 630 by the recipient so that the sender can observe the change in recipient's reaction in response to portion of the content that is being wiped clean. In one embodiment, the location of the reaction image/video and wiping action 630 may be switched such that the reaction frame is smaller than wiping action 630. In another embodiment, a user may determine the location of each of these views on the screen and/or touch each one to switch it location with the other on the touch screen 132.

Figure 18:
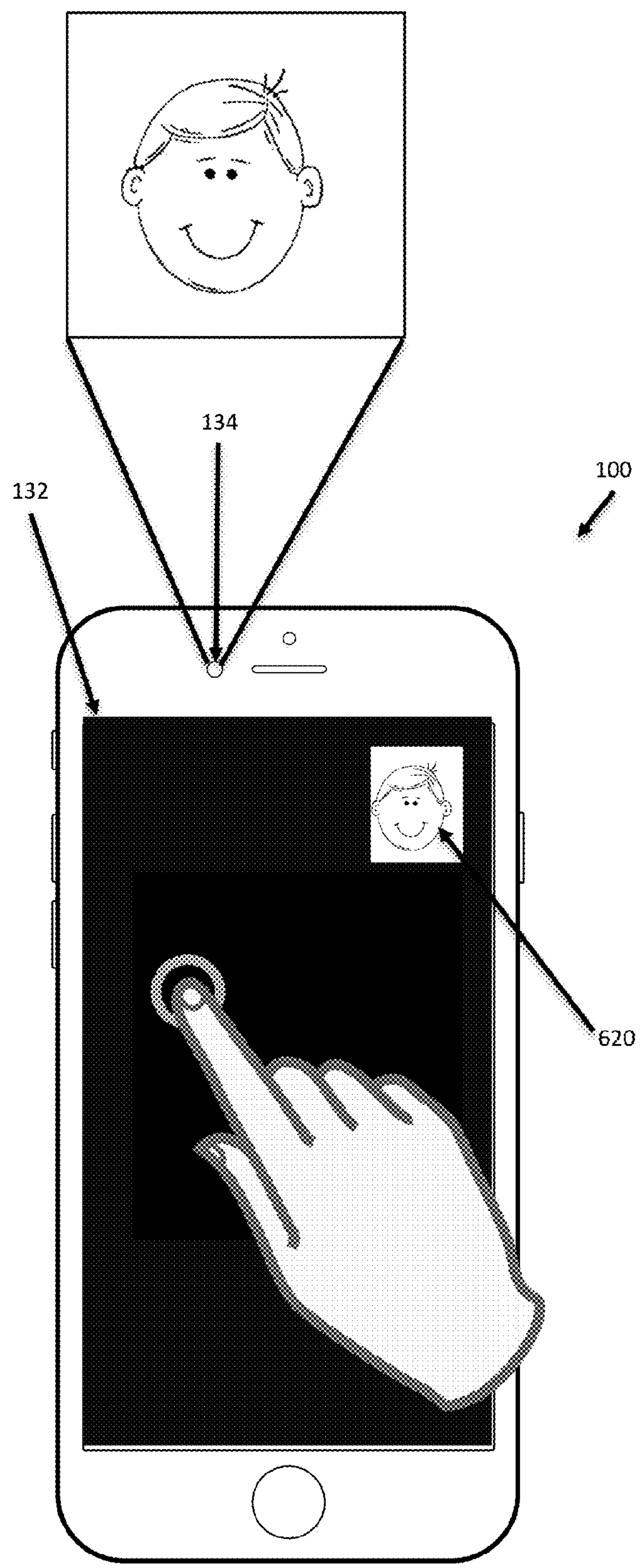
FIG. 18 shows a method of using the portable multifunction device, according to an embodiment of the invention.
Figure 19:
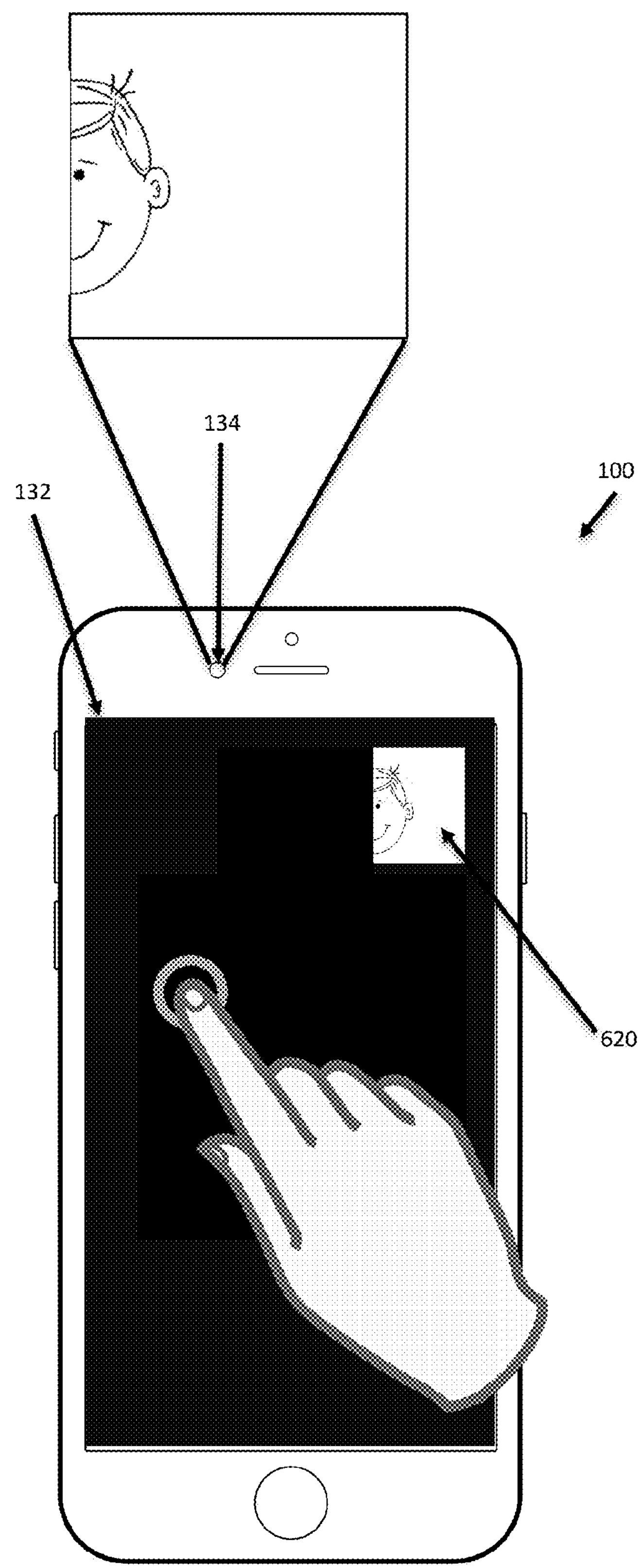
FIG. 19 shows a method of using the portable multifunction device, according to an embodiment of the invention.

In one embodiment, the sender of the content may specify that a recording of reaction by the recipient is mandatory. Therefore, the recipient may not have the option of touching the cancel button 610 to decline the recording of reaction. In addition, a face detection module (which may be part of other module(s) 103 in FIG. 1) may monitor the video feed from the front facing camera 134 and determine whether or not a face is substantially in front of the camera. As shown in FIG. 18, when a face is in front of the camera, the recipient may wipe the screen. However, if the face detection module cannot detect a full face as shown in FIG. 19, then the screen may become fully obscured and the wiping action disabled until a face is again detected.

Figure 20:
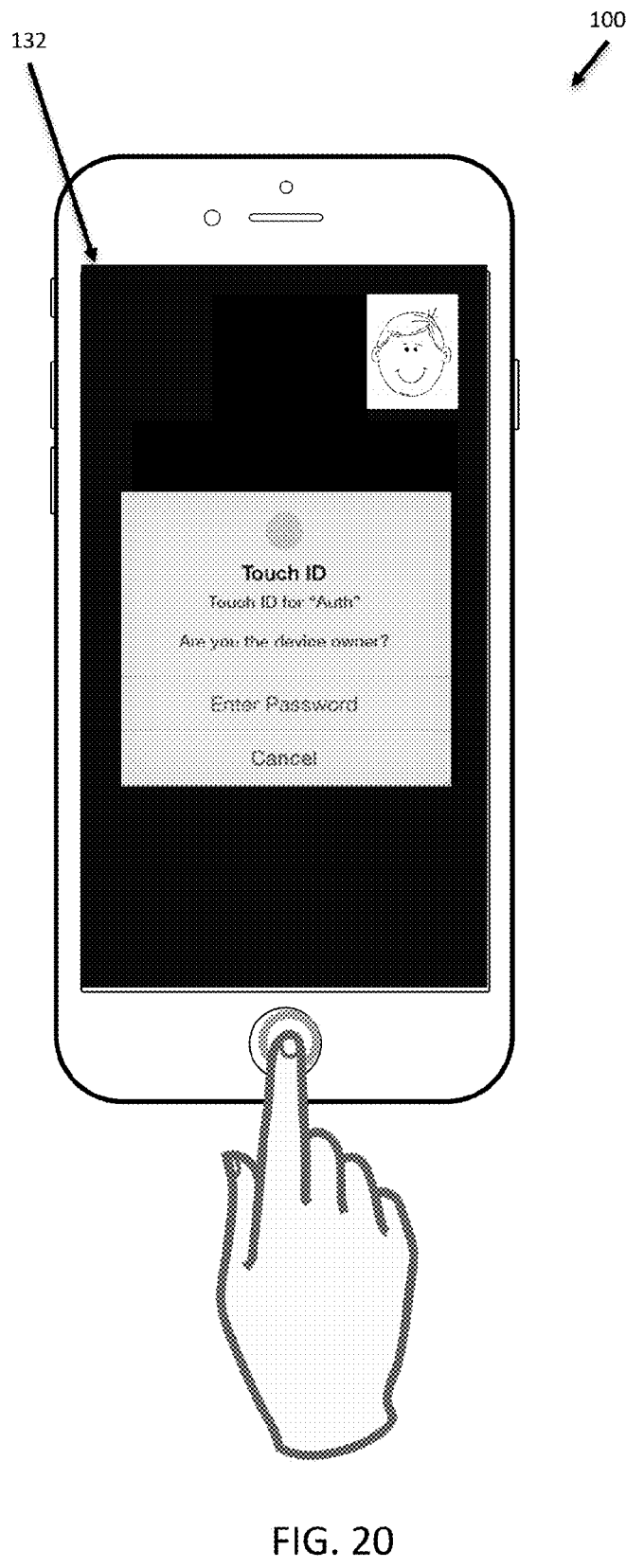

In one embodiment, shown in FIG. 20, in addition or instead of authenticating the recipient by facial recognition as described above, the recipient may be authenticated via biometric information such as fingerprint. In one embodiment, the recipient is instructed to place his/her finger on a finger print scanner coupled to the portable multifunction device 100 and a fingerprint is scanned and authenticated by the device. Some portable multifunction devices are equipped with finger print scanners and can be used for this operation. For example iPhone and Samsung Galaxy smart phones both have build in fingerprint scanners that can be utilized for authenticating users.

Figure 21:
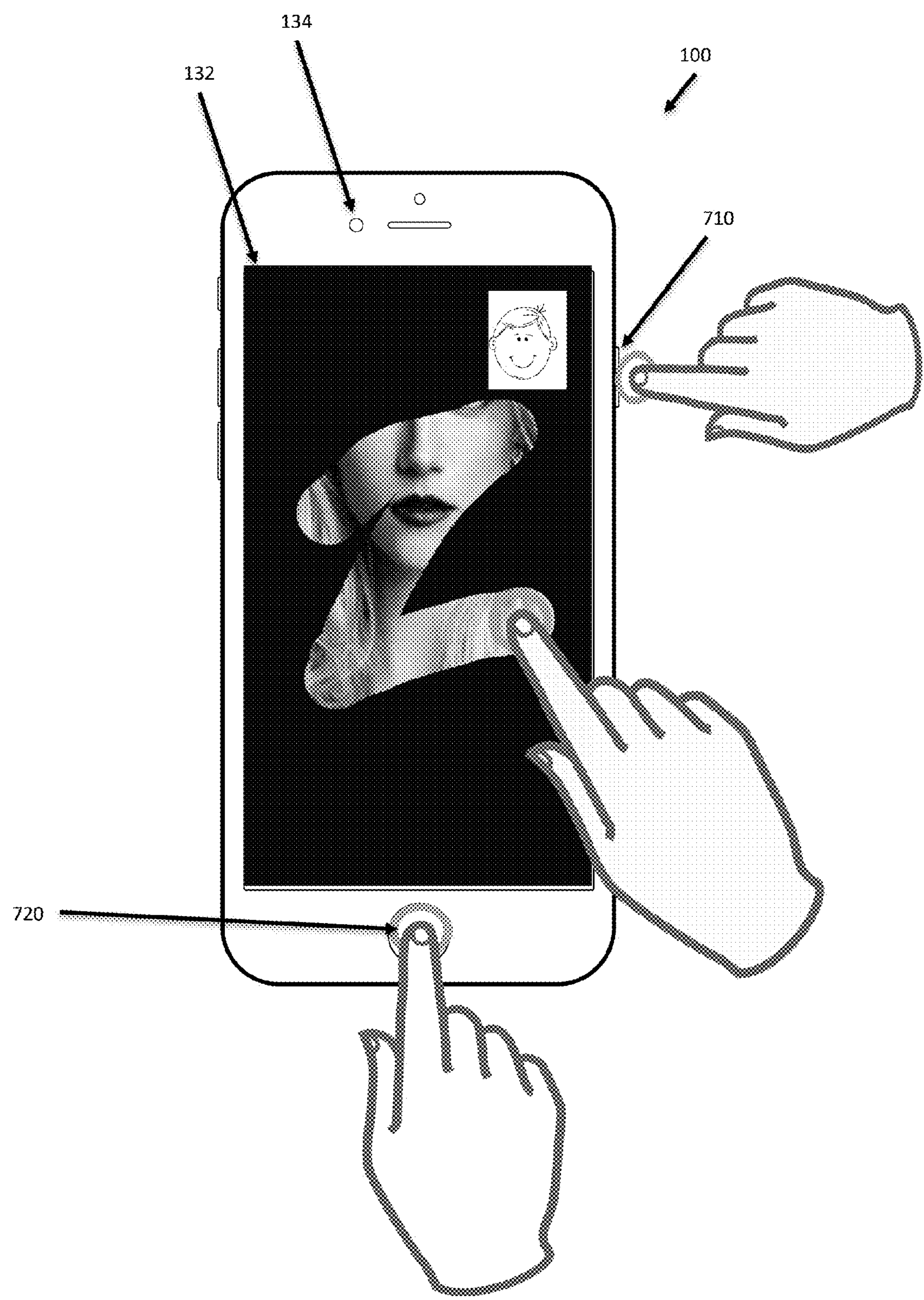
FIG. 21 shows a method of using the portable multifunction device, according to an embodiment of the invention.
Figure 22:
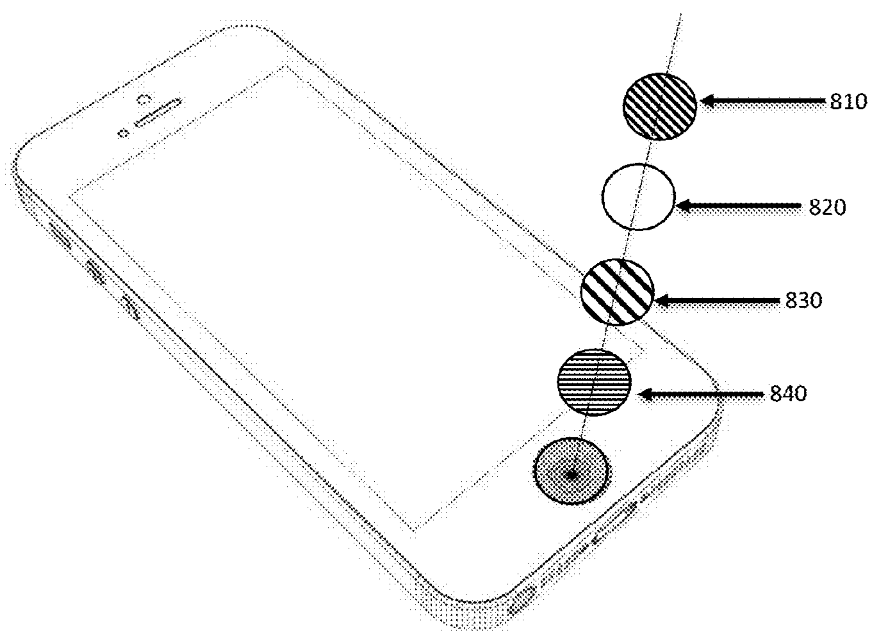
FIG. 22 shows various elements of the portable multifunction device, according to an embodiment of the invention.

In one embodiment, in order to prevent the recipient from saving the content, one or more buttons and/or sensors of the portable multifunction device 100 may 100 that can be used to take a screenshot may be monitored to detect whether or not they are about to be used for such purpose. For example, as shown in FIG. 21, a screenshot using iPhones can be taken by pressing the "home" button and the "power button" on the side or top if the device. Some iPhones are equipped with a "touchID" sensor that can be sued for scanning fingerprints. Different parts of the "home button" which include the touchID sensor are shown in FIG. 22. iPhone's touchID comprises of a sapphire-crystal cover 810, detection ring 820, touchID sensor 830 and tactile switch 840. The detection ring 820 is configured to detect whether a finger is touching the "home button". In one embodiment, if the detection ring detects the presence of the finger on the home button, the touch screen 132 may become fully obscured and the recipient is prevented from wiping the screen until the finger is removed. This technique is particularly useful in situations where two people coordinate to take a screenshot from the content. As shown in FIG. 20, one user may assume the position of taking a screenshot while the other is wiping the screen. Even though that such screen shot will not save the entire content due to the fact that the screen is becoming re-obscured while the user is wiping. A screenshot may save a part of the content. However, when placement of a finger on the home button is detected, the screen may become fully obscured and the wiping action may not clear the screen until the finger is removed. One example of touch ID sensor is disclosed in the U.S. Pat. No. 9,030,440B2 (grant) entitled "Capacitive Sensor Packaging."

In some embodiments, heuristics are used to translate imprecise finger gesture into actions desired by the user. A gesture recognizer algorithm of an operating system may capture the above-noted wiping action by finger stroke and may apply one or more heuristics to translate the finger strokes (e.g. A2, A4, and A6) into paths that include pixel data from the original image.

In one embodiment, in addition or instead of sending the content through the secure display module 104 such that the recipient also views the content via an equivalent module on his/her portable multifunction device, the content may be generated through the secure display module but transmitted through any other third party communication platform. For example, a sender may generate the content using the secure display module 104, but post a link to the content on social media or transfer that link though another module (e.g. a messaging app) to a recipient. When the link is activated, the content may load in a web-based environment or load an appropriate module such as the secure display mobile 104.

In some embodiments, the sender of the content may be able to determine certain criteria that dictate how the recipient views the content. For example, the sender may determine the following:

- Sender may determine how long the content can be viewed. In one embodiment, the sender may set a message viewing time. When the receiver starts viewing the content, the content disappears after expiry of the message viewing time.

The sender may determine the width of a finger stroke that clears the path of the touch screen. For example, the sender may determine that whatever the width of recipient's natural finger stroke, the finger stroke that is applied by the touch screen is either less or more than the natural finger stroke width of the recipient. If, for example, the sender wants to make it easier for the recipient to view the content as he/she is wiping the touch screen, the sender may set the width of the finger stroke to be 2× of recipient's natural finger stroke width.

The sender may set a predetermined amount of time where the obscured layer reclaims the view and obscures the content.

The sender may determine the level of transparency of layers 410-430 in FIG. 12. And the sender may also determine the predetermined amount of time where the layers 410-430 are applied to the content.

In one embodiment, if the receiver lifts his/her finger off the touch screen while viewing the content, the obscured layer may fill the entire screen. The sender may determine after what amount of time this happens and may also allow the process to continue (i.e. the obscured layer gradually reclaim the wiped area of the screen) without the obscured layer filling the entire content.

The sender may determine that a reaction to the content (as described with respect to FIG. 14) is required and the recipient cannot view the content without recording a reaction.

In one embodiment, the recipient of the content may have the option of forwarding a received content to another portable multifunction device. However, the sender may determine that content cannot be forwarded by the recipient to another portable multifunction device of another person.

In one embodiment, the sender may recall a message and if the recall operation is completed before viewing the content of the message by the recipient, the recipient may be notified that a message was recalled.

In one embodiment, content may be available to view for a predetermined amount of time, and it may expire and deleted from the server if not viewed within the time limit. In one embodiment, the sender may determine the expiry time for a message. For example, the sender may determine that the content can be viewed within three hours from transmission or receipt by the recipient.

In one embodiment, if a message is expired, the sender can activate a resend function (e.g. by pressing a resend button) to resend the content.

In one embodiment, the sender may include a challenge response that the recipient needs to provide a correct answer for before being able to view the content. For example, in one embodiment, the challenge response may be a password, a quiz designed by the sender, a decryption key or any other means that can be used to lock and unlock a message.

In one embodiment, the sender may require that the recipient be authenticated with biometric info such as fingerprint, voice sample authentication, face recognition, or any combination of these before viewing the content.

In some embodiments, the recipient of the content may be able to determine certain criteria that determine how content is viewed. For example, the recipient may determine the following:

In one embodiment, the recipient may determine the width of a finger stroke that clears the path of the touch screen. For example, the recipient may determine that whatever the width of recipient's natural finger stroke, the finger stroke that is applied by the touch screen is either less or more than the natural finger stroke width of the recipient. The recipient may set the width of the finger stroke to be 2× of recipient's natural finger stroke width.

In one embodiment, the recipient may request for more time to view the message either by requesting from the sender to increase the time limit for viewing the content both for the time limit that the recipient has to view the content and for time limit that determines how long the content remains visible on the screen. In one embodiment, the recipient may request for more time by paying an amount of money to buy more time to view the content.

In one embodiment, when the recipient's reaction is being recorded, a face detection algorithm may detect whether the recipient is smiling, laughing or makes any other facial gestures. The facial gesture of the recipient may be associated with an emoticon (emoji) or any drawing or artwork that resembles the recipient's facial gesture. The emoticon and/or the drawing can then be sent back to the sender so that the sender is informed of how the recipient reacted to the message.

In one embodiment, when the recipient is done with viewing the content, he/she can send a text message in reply to the content. This text message may be in addition or in instead of a recorded reaction which may be an image or a video or both. In one embodiment, the recipient may be presented with an option to send a text message right after viewing the content. If the recipient sends a text message, the sender may receive that text message separately on the same user interface that includes the recorded reaction or as part of the recorded reaction. In one embodiment, the text message may be transferred through a different software application.

Below are some additional exemplary embodiments of the invention:

1. A computing device, comprising:

a touch screen display;

one or more processors;

memory; and one or more programs, wherein the one or more programs are stored in the memory and configured to be executed by the one or more processors, the one or more programs including:

instructions for detecting one or more finger contacts with the touch screen display; and instructions for drawing one or more images on the touch screen display comprising:

saving in memory, data associated with locations of the finger contacts with the touch screen display;

locating stroke image data associated with a first image, using the data associated with locations of the finger contacts with the touch screen display, wherein the stroke image data corresponds to pixel data of the first image that are located in the same coordinates as the locations of the one or more finger contacts; and drawing a display image on the touch screen display, wherein the display image is comprised of image data from the first image and a second image, and wherein the image data from the first image comprise of the stroke image data.

2. The computing device of claim 1, wherein a subsequent display image is drawn in response to detecting each of the one or more finger contacts.

3. The computing device of claim 2, wherein as the subsequent display image is drawn, the stroke image data from the first image is replaced with image data from the second image.

4. The computing device of claim 3, wherein the stroke image data from the first image is replaced with image data from the second image after a predetermined amount of time.

5. The computing device of claim 1, wherein the first image is a visible image.

6. The computing device of claim 1, wherein the second image is an obscured image.

7. The computing device of claim 1, wherein the obscured portion includes Gaussian blur of the first image.

8. The computing device of claim 1, wherein the instructions for drawing one or more images on the touch screen display is executed each time one or more finger contacts with the touch screen is detected.

9. The computing device of claim 8, wherein the instructions for drawing one or more images on the touch screen display is executed at a rate of 60 frames per seconds.

10. The computing device of claim 8, wherein the instructions for drawing one or more images on the touch screen display is executed at a rate equivalent to a refresh rate defined by the touch screen display.

11. The computing device of claim 8, wherein the instructions for drawing one or more images on the touch screen display is executed at a rate between 40 to 120 frames per seconds.

12. The computing device of claim 8, wherein the instructions for detecting one or more finger contacts with the touch screen display detects one or more finger contacts on the touch screen moving in any direction.

13. A method comprising:

detecting one or more finger contacts on a touch screen display; and drawing one or more images on the touch screen display in response to detecting the one or more finger contacts, wherein drawing one or more images comprises the steps of:

locating stroke image data associated with a first image, using the data associated with locations of the finger contacts with the touch screen display, wherein the stroke image data corresponds to pixel data of the first image that are located in the same coordinates as the locations of the one or more finger contacts; and drawing a display image on the touch screen display, wherein the display image is comprised of image data from the first image and a second image, and wherein the image data from the first image comprise of the stroke image data.

14. The method of claim 13, wherein a subsequent display image is drawn in response to detecting each of the one or more finger contacts.

15. The method of claim 14, wherein as the subsequent display image is drawn, the stroke image data from the first image is replaced with image data from the second image.

16. The method of claim 15, wherein the stroke image data from the first image is replaced with image data from the second image after a predetermined amount of time.

17. The method of claim 13, wherein the first image is a visible image.

18. The method of claim 13, wherein the second image is an obscured image.

19. The method of claim 13, wherein the obscured portion includes Gaussian blur of the first image.

20. The method of claim 13, wherein drawing one or more images on the touch screen display is executed each time one or more finger contacts with the touch screen is detected.

21. The method of claim 20, wherein the instructions for drawing one or more images on the touch screen display is executed at a rate of 60 frames per seconds.

22. The method of claim 20, wherein the instructions for drawing one or more images on the touch screen display is executed at a rate equivalent to a refresh rate defined by the touch screen display.

23. The method of claim 20, wherein the instructions for drawing one or more images on the touch screen display is executed at a rate between 40 to 120 frames per seconds.

24. The method of claim 20, wherein the instructions for detecting one or more finger contacts with the touch screen display detects one or more finger contacts on the touch screen moving in any direction.

25. A computing device, comprising:

a touch screen display; one or more processors; memory; and one or more programs, wherein the one or more programs are stored in the memory and configured to be executed by the one or more processors, the one or more programs configured to:

display electronic content on the touchscreen display, wherein the electronic content is hidden behind an obscured layer;

detect one or more finger strokes on the touchscreen display, when a finger interacts with the touchscreen display;

remove the obscured layer from only the areas on the screen touched by the finger in any direction; and apply a first semi-transparent layer, after a predetermined amount of time, to the areas of the screen where obscured layer was removed, wherein the electronic content is partially visible through the first semi-transparent layer.

26. The computing device of claim 25, wherein the one or more programs is further configured to:

apply a second transparent layer, after a predetermined amount of time, to the areas of the screen where obscured layer was removed, wherein the electronic content is partially visible through the second semi-transparent layer, and wherein the visibility of the electronic content through the second semi-transparent layer is less than the first semi-transparent layer.

27. The computing device of claim 25, wherein one or more programs is further configured to:

apply the obscured layer to the areas where the first semi-transparent was applied, after a predetermined amount of time, wherein during the time frame where the obscured layer is removed and applied, the electronic content is partially visible through the first semi-transparent layer.

28. The computing device of claim 25, wherein the electronic content is a digital image.

29. The computing device of claim 25, wherein the electronic content is a video.

30. The computing device of claim 25, wherein the obscured layer is removed from an area on the touchscreen display that corresponds to the width of the finger on a location on the touchscreen display that is substantially underneath the finger stroke.

31. The computing device of claim 25, wherein the finger stroke can move in any direction on the touch screen display.

32. The computing device of claim 25, wherein as the obscured layer is removed from selective areas of the touchscreen display based on the direction of the finger stroke, same areas of the touch screen display are occupied by the semi-transparent layer in the order in which the obscured layer was removed form the touchscreen display and then obscured with the obscured layer and creating a gradual fading of the electronic content followed by a tracing effect wherein the obscured layer follows the finger stroke with a time delay and obscures the touchscreen display.

33. A method comprising:

displaying electronic content on the touchscreen display, wherein the electronic content is hidden behind an obscured layer;

detecting one or more finger strokes on the touchscreen display, when a finger interacts with the touchscreen display;

removing the obscured layer from only the areas on the screen touched by the finger in any direction; and applying a first semi-transparent layer, after a predetermined amount of time, to the areas of the screen where obscured layer was removed, wherein the electronic content is partially visible through the first semi-transparent layer.

34. The method of claim 33, the method further comprising:

applying a second transparent layer, after a predetermined amount of time, to the areas of the screen where obscured layer was removed, wherein the electronic content is partially visible through the second semi-transparent layer, and wherein the visibility of the electronic content through the second semi-transparent layer is less than the first semi-transparent layer.

35. The method of claim 33, the method further comprising:

applying the obscured layer to the areas where the first semi-transparent was applied, after a predetermined amount of time, wherein during the time frame where the obscured layer is removed and applied, the electronic content is partially visible through the first semi-transparent layer.

36. The method of claim 33, wherein the electronic content is a digital image.

37. The method of claim 33, wherein the electronic content is a video.

38. The method of claim 33, wherein the obscured layer is removed from an area on the touchscreen display that corresponds to the width of the finger on a location on the touchscreen display that is substantially underneath the finger stroke.

39. The method of claim 33, wherein the finger stroke can move in any direction on the touch screen display.

40. The method of claim 9, wherein as the obscured layer is removed from selective areas of the touchscreen display based on the direction of the finger stroke, same areas of the touch screen display are occupied by the semi-transparent layer in the order in which the obscured layer was removed form the touchscreen display and then obscured with the obscured layer and creating a gradual fading of the electronic content followed by a tracing effect wherein the obscured layer follows the finger stroke with a time delay and obscures the touchscreen display.

41. A computing device, comprising:

a touch screen display;

one or more processors;

memory; and one or more programs, wherein the one or more programs are stored in the memory and configured to be executed by the one or more processors, the one or more programs including:

instructions for detecting one or more finger contacts with the touch screen display; and instructions for drawing one or more images on the touch screen display comprising:

saving in memory, data associated with locations of the finger contacts with the touch screen display;

locating stroke image data associated with a first image, using the data associated with locations of the finger contacts with the touch screen display, wherein the stroke image data corresponds to pixel data of the first image that are located in the same coordinates as the locations of the one or more finger contacts; and drawing a display image on the touch screen display, wherein the display image is comprised of image data from the first image, a second image and a third image, and wherein the image data from the first image comprise of the stroke image data, and wherein a portion of the third image is added to a portion of image data from the first image.

42. The computing device of claim 41, wherein a subsequent display image is drawn in response to detecting each of the one or more finger contacts.

43. The computing device of claim 42, wherein as the subsequent display image is drawn, the stroke image data from the first image is replaced with image data from the second image.

44. The computing device of claim 43, wherein the stroke image data from the first image is replaced with image data from the second image after a predetermined amount of time.

45. The computing device of claim 41, wherein the first image is a visible image.

46. The computing device of claim 41, wherein the second image is an obscured image.

48. The computing device of claim 41, wherein the obscured portion includes Gaussian blur of the first image.

49. The computing device of claim 41, wherein the instructions for drawing one or more images on the touch screen display is executed each time one or more finger contacts with the touch screen is detected.

50. The computing device of claim 49, wherein the instructions for drawing one or more images on the touch screen display is executed at a rate of 60 frames per seconds.

51. The computing device of claim 49, wherein the instructions for drawing one or more images on the touch screen display is executed at a rate equivalent to a refresh rate defined by the touch screen display.

52. The computing device of claim 49, wherein the instructions for drawing one or more images on the touch screen display is executed at a rate between 40 to 120 frames per seconds.

53. The computing device of claim 49, wherein the instructions for detecting one or more finger contacts with the touch screen display detects one or more finger contacts on the touch screen moving in any direction.

54. An electronic device for securely displaying electronic data, the device comprising:

a touch screen display;

a camera;

one or more processors;

memory; and one or more programs, wherein the one or more programs are stored in the memory and configured to be executed by the one or more processors, the one or more programs configured to:

receive electronic data from a server computer;

display the electronic data on the touch screen display, wherein the electronic data is hidden behind an obscured layer;

detect one or more finger strokes on the touch screen display, when a finger interacts with the touchscreen display;

remove the obscured layer from only the areas on the screen touched by the finger in any direction; and record a video using the camera in response to detecting one or more finger strokes on the touch screen display.

55. The electronic device of claim 54, wherein the one or more programs configured to:

detect a presence of a face from the video recorded using the camera;

wherein removal of the obscured layer is only possible when a face is detected.

56. The electronic device of claim 54, wherein the one or more programs configured to:

detect a presence of a face from the video recorded using the camera;

authenticate an identity of a person associated with the face; and removing the obscured layer from only the areas on the screen touched by the finger in any direction when the authentication is successful.

57. The electronic device of claim 54, wherein the one or more programs configured to send the video recorded using the camera to the server computer.

58. The electronic device of claim 54, wherein the one or more programs configured to send data associated with the location of removal of the obscured layer to the server computer.

59. The electronic device of claim 54, wherein the one or more programs configured to:

send the video recorded using the camera to the server computer; and send data associated with the location of removal of the obscured layer to the server computer; wherein the server computer transmits the video and the data associated with the location of the removal of the obscured layer to another electronic device associated with a sender of the electronic data.

60. The electronic device of claim 54, wherein the electronic data is a digital image.

61. The electronic device of claim 54, wherein the electronic data is a video.

62. A server computer configured to transmit electronic data between a first electronic device and a second electronic device; the server comprising:

one or more processors;

memory; and one or more programs, wherein the one or more programs are stored in the memory and configured to be executed by the one or more processors, the one or more programs configured to:

receive electronic data from the first electronic device;

send the electronic device to the second electronic device;

receive data from the second electronic device, associated with displaying a portion of the electronic data on a screen of the second electronic device;

receive a video from the second electronic device, wherein the video is recorded while the portion of the electronic data is displayed on the second electronic device; and send the data and the video received from the second electronic device to the first electronic device.

63. The server computer of claim 62, wherein the first electronic device includes a touch screen display.

64. A method of providing feedback to a sender of a message comprising:

displaying the message to a recipient of the message;

recording a video from the recipient of the message as the message is displayed;

analyzing the video for detecting one or more facial patterns of the recipient of the message;

associating an image with the video based on facial patterns of the recipient of the message; and sending the image to a server computer, wherein the server computer sends the image back to the sender of the message.

65. A method of sending a message comprising:

applying an obscured layer to the message wherein the message is not fully visible through the obscured layer; and creating an animated gif file from the message, wherein the animated gif file animates a removal of the obscured layer from a portion of the message thereby making a portion of the message partially visible.

66. The method of claim 65, wherein removal of the obscured layer is based on detecting a predetermined portion of the message and selectively removing the obscured layer from the predetermined portion.

67. The method of claim 66, wherein the message is an image.

68. The method of claim 67, wherein the predetermined portion is an area of the image where a human eye is located.

69. A computing device comprising:

a finger detection sensor;

a touch screen display;

one or more processors;

one or more programs, wherein the one or more programs are stored in the memory and configured to be executed by the one or more processors, the one or more programs configured to:

detect presence of a finger on the finger detection sensor; and display an obscured layer on the touch screen display in response to detection of presence of the finger on the finger detection sensor.

70. The computing device of claim 69, wherein the obscured layer obscures a message displayed on the touch screen display.

71. The computing device of claim 69, wherein the obscured layer obscures an image displayed on the touch screen display.

72. The computing device of claim 69, wherein the obscured layer obscures a video displayed on the touch screen display and stops the playback of the video.

73. A method of viewing digital content on a touch screen display comprising:

moving a finger on the touch screen display in any direction while the finger maintains physical contact with the touch screen display, wherein the touch screen display is covered by an obscured layer, and wherein movement of the finger on while maintaining physical contact with the touch screen display partially removes the obscured layer from the touch screen display.

74. The method of claim 73, wherein the obscured layer obscures the portion of the touch screen display that was cleared as a result of moving the finger after a predetermined amount of time.

74. The method of claim 74, wherein when the obscured layer obscured the portion of the touch screen display that was cleared as a result of moving the finger, additional movement of the finger over same area of the touch screen display again removes the obscured layer.

75. The method of claim 74, wherein when the finger losses the physical contact with the touch screen display, the entirety of the touch screen display is obscured.

The software components or functions described in this application may be implemented as software code to be executed by one or more processors using any suitable computer language such as, for example, Objective C, C#, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk. Any such computer-readable medium may also reside on or within a single computational apparatus, and may be present on or within different computational apparatuses within a system or network.

Embodiments of the present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computing device, comprising:

a touch screen display configured to display a first image concealed by a second image;

one or more processors;

a memory coupled to the processors and storing instructions which when executed by the processors cause the processors to perform a method, wherein the method comprises:

detecting one or more finger contacts with the touch screen display;

identifying a trace on the touch screen display created by the finger contacts, wherein the trace comprises at least a first segment and a second segment;

consecutively clearing portions of the second image corresponding to the first and second segments of the trace to reveal corresponding portions of the first image; and subsequent to clearing portions of the second image corresponding to the first and second segments of the trace for a predetermined time period, consecutively redraw the cleared portions of the second image to re-conceal the corresponding portions of the first image.

2. The computing device of claim 1, wherein the method further comprises aggregating in the memory one or more coordinates on the touch screen display that correspond to the one or more finger contacts, and wherein redrawing the cleared portions of the second image is performed in a timed fashion and in an order that the one or more coordinates are aggregated in memory.

3. The computing device of claim 1, wherein the one or more finger contacts between the first coordinate and the second coordinate can move at any speed.

4. The computing device of claim 1, further comprising a camera, and wherein the method further comprises configuring the camera to record a video while clearing the portions of the second image.

5. The computing device of claim 1, wherein the one or more finger contacts comprise a finger dragging gesture.

6. The computing device of claim 5, wherein the method further comprises:

determining a width of the trace based on widths of the one or more finger contacts, wherein the one or more finger contacts are interpreted to cover an area on the touch screen display that is larger or smaller than the actual width of an area covered by the one or more finger contacts.

7. A computer-implemented method, comprising:

detecting, at a computing device with a touch screen display, one or more finger contacts with the touch screen display;

identifying a trace on the touch screen display created by the finger contacts, wherein the trace comprises at least a first segment and a second segment;

consecutively clearing portions of the second image corresponding to the first and second segments of the trace to reveal corresponding portions of the first image; and subsequent to clearing portions of the second image corresponding to the first and second segments of the trace for a predetermined time period, consecutively redraw the cleared portions of the second image to re-conceal the corresponding portions of the first image.

8. The method of claim 7, further comprising aggregating in memory one or more coordinates on the touch screen display that correspond to the one or more finger contacts, and wherein redrawing the cleared portions of the second image is performed in a timed fashion and in an order that the one or more coordinates are aggregated in memory.

9. The computing device of claim 1, wherein clearing the portions of the second image comprises replacing, in the memory, pixel data of the second image with pixel data of the first image at locations corresponding to the first and second segments of the trace.

10. The method of claim 7, wherein clearing the portions of the second image comprises replacing pixel data of the second image with pixel data of the first image at locations corresponding to the first and second segments of the trace.

* * * * *